US008438232B2

(12) United States Patent
Tsuboi et al.

(10) Patent No.: US 8,438,232 B2
(45) Date of Patent: May 7, 2013

(54) E-MAIL TRANSMISSION DEVICE, E-MAIL TRANSMISSION METHOD, AND COMPUTER READABLE MEDIUM

(75) Inventors: Tomo Tsuboi, Itami (JP); Tomoyuki Okamoto, Suita (JP); Yasuji Takeuchi, Kobe (JP); Nobuo Kamei, Osaka (JP); Yoshiaki Shibuta, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 320 days.

(21) Appl. No.: 12/844,038

(22) Filed: Jul. 27, 2010

(65) Prior Publication Data
US 2011/0035454 A1 Feb. 10, 2011

(30) Foreign Application Priority Data
Aug. 5, 2009 (JP) ................................. 2009-182015

(51) Int. Cl.
*G06F 15/16* (2006.01)

(52) U.S. Cl.
USPC .......................................... 709/206; 709/245

(58) Field of Classification Search .................. 709/206, 709/245
See application file for complete search history.

(56) References Cited

U.S. PATENT DOCUMENTS

| 6,154,783 | A  | * | 11/2000 | Gilmour et al. | 709/245 |
| 6,249,807 | B1 | * | 6/2001 | Shaw et al. | 709/206 |
| 6,829,613 | B1 | * | 12/2004 | Liddy | 707/694 |
| 7,016,859 | B2 | * | 3/2006 | Whitesage | 705/7.31 |
| 7,216,227 | B2 | * | 5/2007 | Grynberg | 713/162 |

(Continued)

FOREIGN PATENT DOCUMENTS
JP  10-143451  5/1998
(Continued)

OTHER PUBLICATIONS

Office Action dated May 24, 2011, issued in the corresponding Japanese Patent Application No. 2009-182015, and an English Translation thereof.

*Primary Examiner* — Kevin Bates
(74) *Attorney, Agent, or Firm* — Buchanan Ingersoll & Rooney PC

(57) ABSTRACT

The present invention is intended to reduce operation load of a responsible person corresponding to external address for transmission of an e-mail to the external address. In order to accomplish this, an e-mail transmission device transmits an e-mail based on an operation made by a user, comprising: a storage part for storing therein a destination address registration information in which a destination address of the e-mail, an address type information in which either of internal address or external address is registered as type of the destination address, and an address responsible for external address registered if the address type registered in the address type information is external address are associated with each other; and a transmission part for transmitting the e-mail to the destination address designated by the user from a plurality of destination addresses included in the destination address registration information. When the address type registered in the address type information associated with the designated destination address is external address, the transmission part reads the address responsible for external address associated with the designated destination address, creates the e-mail in which the address responsible for external address is set for a source address field and a return address field, and transmits the e-mail thereby created to the designated destination address.

23 Claims, 25 Drawing Sheets

U.S. PATENT DOCUMENTS

| | | | |
|---|---|---|---|
| 7,496,628 B2 * | 2/2009 | Arnold et al. | 709/206 |
| 7,698,462 B2 * | 4/2010 | McQuillen et al. | 709/238 |
| 8,001,197 B2 * | 8/2011 | Hutchison et al. | 709/206 |
| 8,028,030 B2 * | 9/2011 | Edlund et al. | 709/206 |
| 2003/0005061 A1 | 1/2003 | Inagaki et al. | |
| 2003/0191806 A1 * | 10/2003 | Osterberg et al. | 709/206 |
| 2003/0229717 A1 * | 12/2003 | Teague | 709/246 |
| 2006/0031327 A1 * | 2/2006 | Kredo | 709/206 |
| 2009/0049130 A1 * | 2/2009 | Plooij et al. | 709/206 |
| 2010/0049807 A1 * | 2/2010 | Thompson | 709/206 |

FOREIGN PATENT DOCUMENTS

| | | |
|---|---|---|
| JP | 2001-016251 | 1/2001 |
| JP | 2002-026960 | 1/2002 |
| JP | 2003-016004 | 1/2003 |
| JP | 2005-094638 A | 4/2005 |
| JP | 2006-197386 | 7/2006 |
| JP | 2006-202175 | 8/2006 |
| JP | 2007-006221 A | 1/2007 |
| JP | 2009-118174 | 5/2009 |

* cited by examiner

FIG. 4

USER INFORMATION  22

| USER ID | USER NAME | PASSWORD | E-MAIL ADDRESS |
|---------|-----------|----------|----------------|
| 10001 | A | **** | aaa@abc.co.jp |
| 10002 | B | **** | bbb@abc.co.jp |
| 10003 | C | **** | ccc@abc.co.jp |
| 10004 | D | **** | ddd@abc.co.jp |
| ⋮ | ⋮ | ⋮ | ⋮ |

DESTINATION ADDRESS REGISTRATION INFORMATION  23

| REGISTRATION NO. | DESTINATION ADDRESS | ADDRESS TYPE | ADDRESS RESPONSIBLE FOR EXTERNAL ADDRESS |
|---|---|---|---|
| 1 | XXX@eeee.co.jp | EXTERNAL ADDRESS | bbb@abc.co.jp |
| 2 | hhh@abc.co.jp | INTERNAL ADDRESS | — |
| 3 | jjj@abc.co.jp | INTERNAL ADDRESS | — |
| 4 | YYY@fff.co.jp | EXTERNAL ADDRESS | ccc@abc.co.jp |
| 5 | ZZZ@ggg.co.jp | EXTERNAL ADDRESS | ddd@abc.co.jp |
| ⋮ | ⋮ | ⋮ | ⋮ |

FIG. 14

```
                    40b
41 → To:            XXX@eeee.co.jp
42 → From:          bbb@abc.co.jp
43 → Reply To:      bbb@abc.co.jp
45 → CC:            bbb@abc.co.jp ; aaa@abc.co.jp
44 → ATTACHMENT FILE:  ****.pdf
   ─────────────────────────────────

○○○ CORPORATION
   MR/MRS ○○

PLEASE FIND AN ATTACHMENT.

□□□ CORPORATION
   PREPARED  ××  ××
```

FIG. 21

DESTINATION ADDRESS REGISTRATION INFORMATION 23

| 23a | 23b | 23c | 23d | 23e |
|---|---|---|---|---|
| REGISTRATION NO. | DESTINATION ADDRESS | ADDRESS TYPE | ADDRESS RESPONSIBLE FOR EXTERNAL ADDRESS | PROCESSING |
| 1 | XXX@eeee.co.jp | EXTERNAL ADDRESS | bbb@abc.co.jp | ENCRYPTION PROCESSING |
| 2 | hhh@abc.co.jp | INTERNAL ADDRESS | — | |
| 3 | jjj@abc.co.jp | INTERNAL ADDRESS | — | |
| 4 | YYY@fff.co.jp | EXTERNAL ADDRESS | ccc@abc.co.jp | TIME STAMP |
| 5 | ZZZ@ggg.co.jp | EXTERNAL ADDRESS | ddd@abc.co.jp | SPECIFIC IMAGE SYNTHESIS |
| ... | ... | ... | ... | ... |

FIG. 24

USER INFORMATION 22

| USER ID | USER NAME | PASSWORD | E-MAIL ADDRESS | GROUP |
|---------|-----------|----------|----------------|-------|
| 10001 | A | **** | aaa@abc.co.jp | GROUP 1 |
| 10002 | B | **** | bbb@abc.co.jp | GROUP 1 |
| 10003 | C | **** | ccc@abc.co.jp | GROUP 2 |
| 10004 | D | **** | ddd@abc.co.jp | GROUP 3 |
| ... | ... | ... | ... | ... |

22a 22b 22c 22d 22e

E-MAIL TRANSMISSION DEVICE, E-MAIL TRANSMISSION METHOD, AND COMPUTER READABLE MEDIUM

This application is based on the application No. 2009-182015 filed in Japan, the contents of which are hereby incorporated by reference.

BACKGROUND OF THE INVENTION

1. Field of the Invention

The present invention relates to an e-mail transmission device, an e-mail transmission method and a computer readable medium, and more particularly, to an information processing technique of transmission of an e-mail for transmitting an e-mail to a destination address registered in advance.

2. Description of the Background Art

Some image processing devices what is generally called, such as a complex device or MFPs (Multi Function Peripherals) are capable of attaching document data generated by reading a document to an e-mail and transmitting the e-mail to destination address designated by a user. These image processing devices conventionally used set information indicating that the image processing device is a source of an e-mail in the email when transmitting an e-mail. As an example, an e-mail address provided to the image processing device is set for a source address field and a return address field of an e-mail, and it shows that the image processing device is the source.

For transmission of an e-mail, the image processing device sets the e-mail address provided to the image processing device for the source address field and the return address field of the e-mail and transmits the e-mail. So, it is difficult to identify a user who operated the image processing device to send the e-mail of a plurality of users who are allowed to use the image processing device. Also, when a reply to the received e-mail transmitted by the image processing device is sent, the reply mail returns to the image processing device. So, a user who operated the image processing device to send the e-mail cannot see the reply mail.

It is a publicly known technique for a complex device connected to a network to extract sender's identification information on the basis of sender's ID entered by a sender and transmit information to a receiver based on the extracted sender's identification information (as disclosed for example in Japanese Patent Application Laid-Open No. JP 2005-94638 A). According to this conventional technique, information indicating that a user operated the image processing device is a source is set, so the problems described above can be solved.

Furthermore, it is a publicly known technique to determine whether or not a destination address is cellular phone's e-mail address, for example, and to change a subject of an e-mail and transmit the e-mail when the destination address is cellular phone's e-mail address (as disclosed for example in Japanese Patent Application Laid-Open No. JP 2007-6221 A). According to this conventional technique, the e-mail set a particular subject corresponding to the destination address is transmitted in order to prevent the e-mail to be rejected the reception by the cellular phone that receives the e-mail.

For the image processing device, such as MFPs, placed in the office and the like, it generally transmits an e-mail to destination address selected by a user from a plurality of destination addresses registered in advance. Destination addresses registered in advance with the image processing device includes internal address, such as within a company, and external address, such as outside the company. For external address, an e-mail address of a company or personal of a business partner or the like is registered.

Regarding operations in the office, for communications with outside the company, such as a business partner, each general person who is in charge of duty does not personally communicate with outside of the company individually. As for example, in many cases, at least one person is assigned as a responsible person who is in charge of contact in the company, and individual person in charge of duty communicates with outside through the responsible person. Also, for support and the like of outside the company, sometimes the number of responsible person in the company is limited to one according to the contract, for example. In such a case, the support of outside the company only accepts e-mails sent by the responsible person appointed in advance.

By way of example, requests for sending e-mails given by a plurality of general persons will be centralized to the responsible person. The responsible person needs to check the request from each general person, convert data format of document data into which allows transmission to outside the company as required, and send the e-mail to requested external address. Centralization of requests for sending e-mails given by a plurality of general persons to the responsible person may cause excessive operation load on the responsible person.

SUMMARY OF THE INVENTION

The present invention is intended to provide an e-mail transmission device, an e-mail transmission method and a computer readable medium that solve the above-described conventional problems. The present invention is intended to realize a reduced burden on a responsible person.

First, the present invention is directed to an e-mail transmission device.

According to one aspect of the e-mail transmission device in the present invention, the e-mail transmission device transmits an e-mail based on an operation made by a user comprises: a storage part for storing therein a destination address registration information in which a destination address of the e-mail, an address type information in which either of internal address or external address is registered as type of the destination address, and an address responsible for external address registered if the address type registered in the address type information is external address are associated with each other; and a transmission part for transmitting the e-mail to the destination address designated by the user from a plurality of destination addresses included in the destination address registration information. In this aspect, when the address type registered in the address type information associated with the designated destination address is external address, the transmission part reads the address responsible for external address associated with the designated destination address, creates the e-mail in which the address responsible for external address is set for a source address field and a return address field, and transmits the e-mail thereby created to the designated destination address.

Second, the present invention is directed to an e-mail transmission method.

According to one aspect of the e-mail transmission method in the present invention, the e-mail transmission method of transmitting an e-mail based on an operation made by a user comprises steps of: (a) storing a destination address registration information in which a destination address of the e-mail, an address type information in which either of internal address or external address is registered as type of the destination address, and an address responsible for external address registered if the address type registered in the address type information is external address are associated with each other; and (b) transmitting the e-mail to the destination address designated by the user from a plurality of destination addresses included in the destination address registration information. In the step (b), when the address type registered in the address type information associated with the designated destination address is external address, the address responsible for external address associated with the designated destination address is read, the e-mail in which the address responsible for external address is set for a source address field and a return address field is created, and the e-mail thereby created is transmitted to the designated destination address.

Third, the present invention is directed to a computer readable medium on which a program is stored.

According to the computer readable medium in the present invention, the program is being executed by an e-mail transmission device. The program causes the e-mail transmission device to execute processing comprising the steps of: (a) storing a destination address registration information in which a destination address of the e-mail, an address type information in which either of internal address or external address is registered as type of the destination address, and an address responsible for external address registered if the address type registered in the address type information is external address are associated with each other; and (b) transmitting the e-mail to the destination address designated by the user from a plurality of destination addresses included in the destination address registration information. In the step (b), when the address type registered in said address type information associated with the designated destination address is external address, the address responsible for external address associated with the designated destination address is read, the e-mail in which the address responsible for external address is set for a source address field and a return address field is created, and the e-mail thereby created is transmitted to the designated destination address.

BRIEF DESCRIPTION OF THE DRAWINGS

FIG. 4 is an example of user information registered in advance with the image processing device;

FIG. 5 is an example of destination address registration information registered with the image processing device;

FIG. 14 is an example of an e-mail transmitted by the image processing device to external address in the third preferred embodiment;

FIG. 21 is an example of the destination address registration information registered with the image processing device in the sixth preferred embodiment;

FIG. 24 is an example of the user information registered in advance with the image processing device in the seventh preferred embodiment.

DESCRIPTION OF THE PREFERRED EMBODIMENTS

Figure 1:
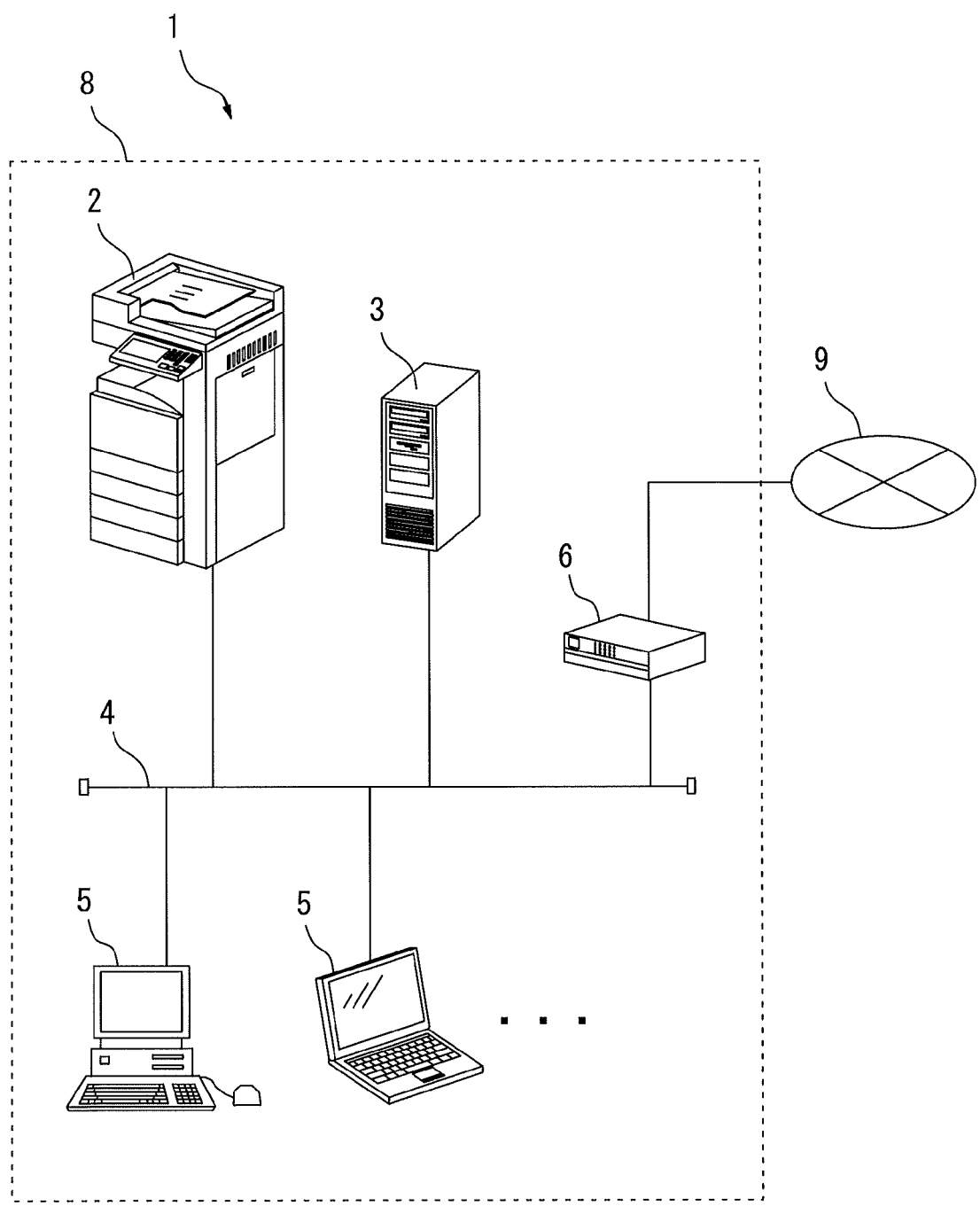
FIG. 1 shows an exemplary configuration of an information processing system which includes an e-mail transmission device to which the present invention applied.

Preferred embodiments of the present invention are described in detail below with reference to figures. In the description given below, those elements which are shared in common among the preferred embodiments are represented by the same reference numerals, and are not discussed repeatedly for the same description.

First Preferred Embodiment

FIG. 1 shows an exemplary configuration of an information processing system 1 of the first preferred embodiment. The information processing system 1 comprises an image processing device 2 called as a complex device or MFPs (Multi Function Peripherals), a mail server 3, a plurality of computers 5 and a networking device 6 such as a router. Each of these devices is connected to each other through a network 4 such as a company LAN (Local Area Network), to enable data communication between each other, so that an internal network 8 is created. The networking device 6 is connected to an external network 9, such as internet. Data communication with the external network 9 is enabled for each of the image processing device 2, the mail server 3 and the computers 5 through the networking device 6. In the example of FIG. 1, while one image processing device 2 is connected to the internal network 8, the number of the image processing device 2 is not limited to one, and more than one image processing device 2 may be connected.

In the first preferred embodiment, the image processing device 2 functions as an e-mail transmission device related to the present invention in the system configuration described herein above as for example. So, the image processing device 2 of the first preferred embodiment has a function of transmitting and receiving e-mails besides several functions including, such as those of a copier, a scanner, a printer, a facsimile, and others. When, for example, a user specifies "SCAN to E-mail," document data generated by reading a document is attached to an e-mail, and the e-mail is transmitted to a destination address designated by the user.

The mail server 3 transmits an e-mail to another mail server in the external network 9 or outputs to each of the computers 5 over the internal network 8, based on destination address of the e-mail transmitted from the image processing device 2, for instance. Each of the computers 5 in the internal network 8 is a general personal computer (PC) or the like that is assigned to each user, for example.

Figure 2:
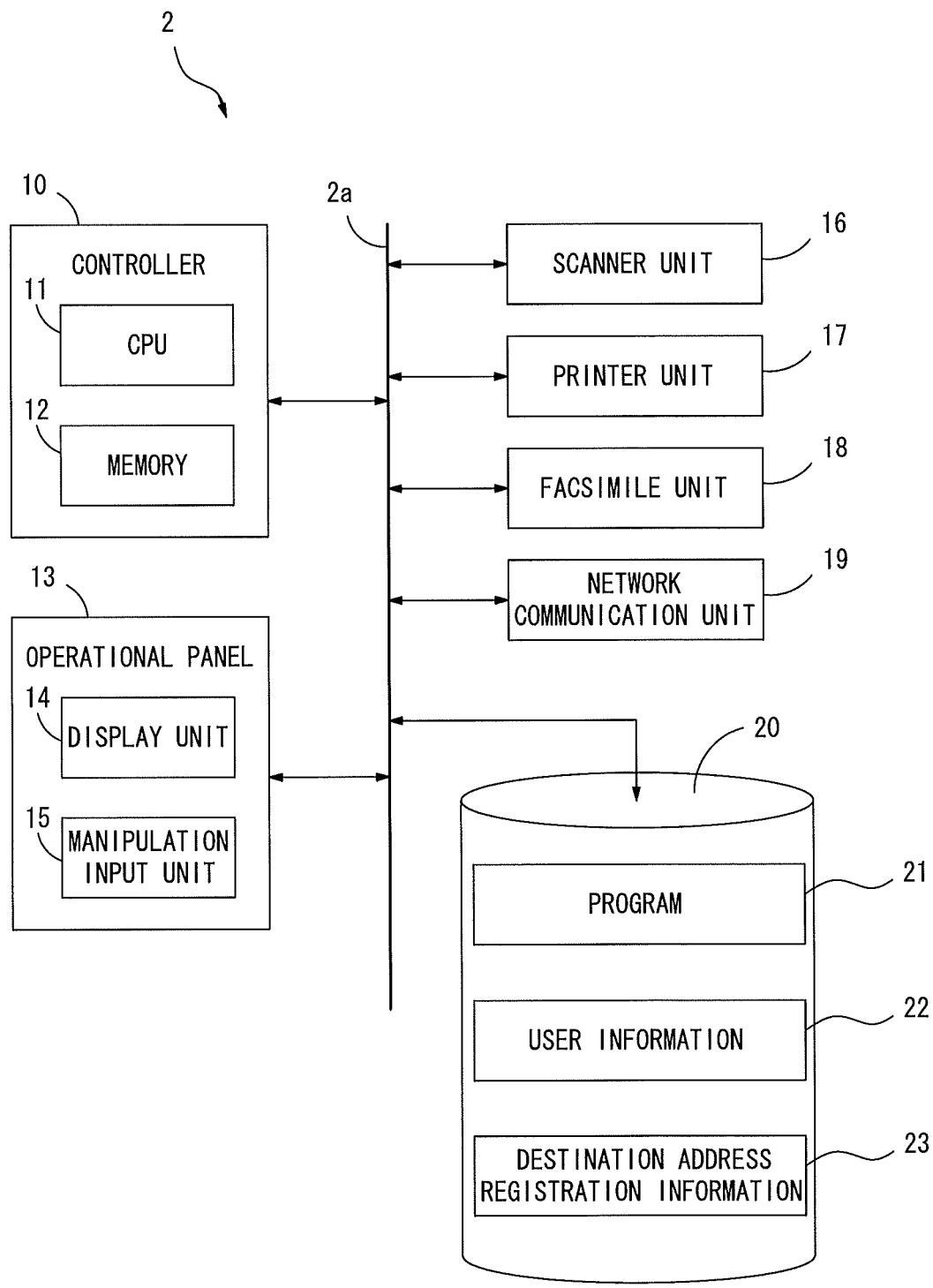
FIG. 2 is a block diagram showing an exemplary internal configuration of an image processing device functions as the e-mail transmission device.

FIG. 2 is a block diagram showing an exemplary internal configuration of the image processing device 2. The image processing device 2 includes a controller 10, an operational panel 13, a scanner unit 16, a printer unit 17, a facsimile unit 18, a network communication unit 19 and a storage device 20 that are allowed input and output of data to each other through a data bus 2a.

The controller 10 includes a CPU 11 and a memory 12. The CPU 11 reads a program 21 stored in advance in the storage device 20 and executes the program 21, thereby controlling each part of the image processing device 2. Especially in the first preferred embodiment, the CPU 11 executes the program 21, and the image processing device 2 functions as an e-mail transmission device. The memory 12 temporarily holds therein various types of data and others generated by execution of the program 21 by the CPU 11, and is constituted by a semiconductor memory or the like.

The operational panel 13 through which a user who uses the image processing device 2 makes input, includes a display unit 14 for displaying various types of information to a user, and an manipulation input unit 15 through which the user makes inputs of various types of information. The display unit 14 is formed, for example, by a liquid crystal display. The manipulation input unit 15 is formed by a plurality of operation keys including touch panel keys arranged on a surface of the display unit 14 and a plurality of push-button keys arranged around the display unit 14.

The scanner unit 16 outputs document data of image read from a document. The document data output by the scanner unit 16 is, for example, stored into the memory 12 of the controller 10 temporary, or into the storage device 20.

The printer unit 17 forms an image into an output sheet or the like based on the document data and outputs the sheet. When the copier function or the printer function of the image processing device 2 is used, or when facsimile data is received, the printer unit 17 operates to form an image and output image formed sheet.

The facsimile unit 18 transmits and receives facsimile data. Public telephone line, for example, is connected to the facsimile unit 18, so that the facsimile unit 18 is capable of transmitting and receiving facsimile data.

The network communication unit 19 connects the image processing device 2 with the network 4 to allow transmission and receipt of data through the network 4. As an example, when the image processing device 2 transmits and receives an e-mail, the e-mail is transmitted and received via the network communication unit 19.

The storage device 20 is a nonvolatile storage device, such as a hard disk device. As shown in FIG. 2, in the storage device 20, the program 21 which is executed by the CPU 11, user information 22 in which information relating to users who use the image processing device 2 are registered, and destination address registration information 23 in which destination addresses of e-mail are registered, are stored. The storage device 20 also stores therein document data read by the scanner unit 16 as described above, document data input from the computers 5 and others through the network 4, and the like.

Figure 3:
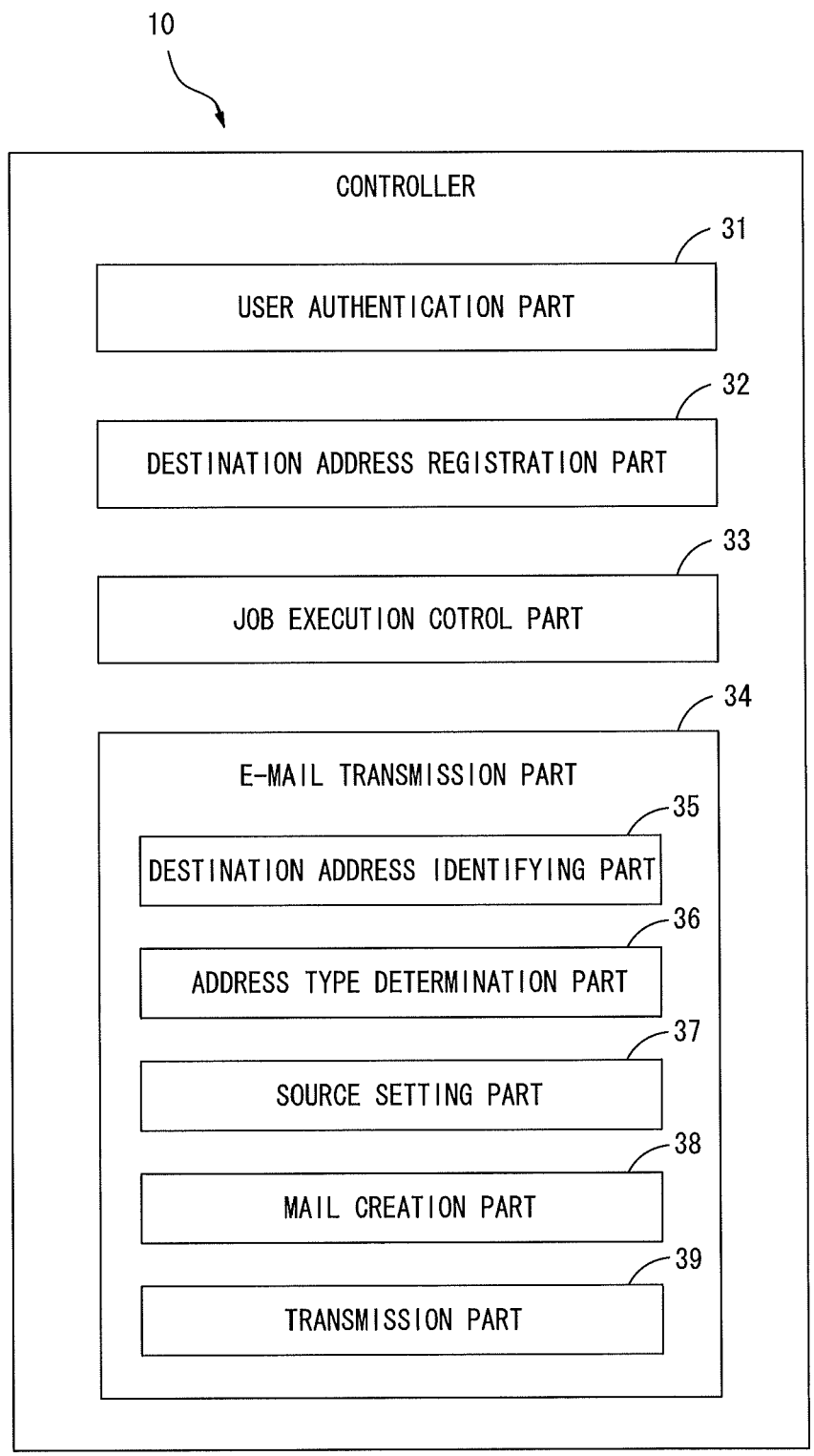
FIG. 3 is a block diagram showing a processing section relating to a function of transmitting e-mail of the image processing device.

By way of example, a case of attaching document data generated by the scanner unit 16 by reading a document to an e-mail and transmitting the e-mail in the above-described image processing device 2 is explained. FIG. 3 is a block diagram showing processing sections relating to a function of transmitting an e-mail as a part of various types of functions of the controller 10 realized by read and execution of the program 21 by the CPU 11.

As illustrated in FIG. 3, the controller 10 functions as a user authentication part 31, a destination address registration part 32, a job execution control part 33 and an e-mail transmission part 34. Furthermore, the e-mail transmission part 34 functions as a destination address identifying part 35, an address type determination part 36, a source setting part 37, a mail creation part 38 and a transmission part 39. Each of those parts is described herein below.

The user authentication part 31 authenticates a user who operates the image processing device 2. The user authentication part 31 reads the user information 22 stored in the storage device 20, and executes user authentication based on user ID and password entered by the user through the operation panel 13.

FIG. 4 is an example of the user information 22 registered in advance with the image processing device 2. As shown in FIG. 4, a user ID 22a, a user name 22b, a password 22c, an e-mail address 22d, and the like of a user who is authorized to use the image processing device 2, is registered in the user information 22. The user authentication part 31 reads the user information 22 and determines whether or not a combination of user ID and password entered through the operational panel 13 is registered in the user information 22, thereby executing user authentication. When the entered combination of user ID and password is registered in the user information 22, authentication results in success. If authentication results in success, user name and e-mail address of the user registered in the user information 22 may be identified. When the entered combination of user ID and password is not registered in the user information 22, authentication results in failure.

As authentication resulting in success, the user authentication part 31 transits the image processing device 2 to a logged-in state in which the identified user is logging in as a logged-in user. In the logged-in state, only functions the logged-in user is authorized in advance of various types of functions of the image processing device 2 are become available. The logged-in user may use the various types of functions made available by making operation on the operational panel 13. When authentication results in failure, the user is not allowed to use the various types of functions of the image processing device 2.

The destination address registration part 32 registers e-mail address of destination into the destination address registration information 23. When an administrator of the image processing device 2 logs in, for example, the destination address registration part 32 comes into operation to function to allow the administrator to register information relating to new destination address into the destination address registration information 23 in response to the administrator's operation.

FIG. 5 is an example of the destination address registration information 23 registered with the image processing device 2. As shown in FIG. 5, a registration number 23a, a destination address 23b of an e-mail, an address type 23c which shows address type of destination address, and an address responsible for external address 23d which is registered if address type is external address, are registered in the destination address registration information 23. The registration number 23a shows the sequence of registration to the destination address registration information 23. An e-mail address which is a destination of an e-mail is registered in the destination address 23b. Information indicates whether the e-mail address registered in the destination address 23b is internal address within the internal network 8 or external address outside the internal network 8 is registered in the address type 23c. If, for instance, the e-mail address in the destination address 23b is internal address, such as in the office, the address type is registered as internal address in the address type 23c. In contrast, if, for example, the e-mail address in the destination address 23b is external address, such as outside the office, the address type is registered as external address in the address type 23c. In the address responsible for external address 23d, when the address type 23c is external address, an e-mail address assigned to a responsible person who is in charge of the external address is registered, for example.

When registration of new destination address is instructed by the administrator logging into the image processing device 2, for instance, the destination address registration part 32 displays a registration screen of a destination address on the display unit 14 of the operational panel 13. The destination address registration part 32 receives an input operation of a new destination address and address type as to the new destination address. If the address type is external address, the destination address registration part 32 further receives input operation of an address responsible for the external address. The destination address registration part 32 then registers information entered by operation made by the administrator into the destination address registration information 23 additionally. The registration of the destination address registration information 23 is not necessarily performed by the administrator with directly making operation on the operational panel 13 of the image processing device 2. As an example, the registration may be remotely operated through the network 4 from one of the computers 5 by the administrator with making operation of the one of the computers 5 allocated to the administrator.

Figure 6:
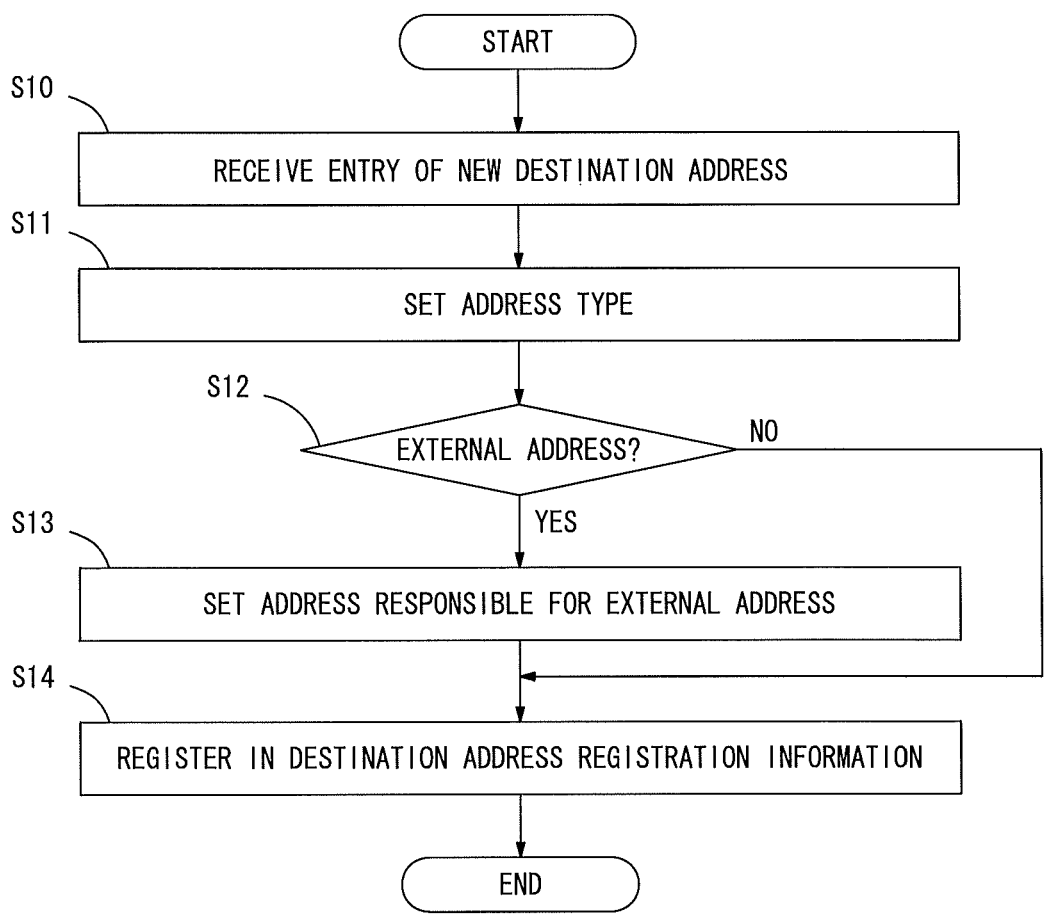
FIG. 6 is a flow diagram explaining an exemplary process sequence of registration of a new destination address with the destination address registration information.

FIG. 6 is a flow diagram explaining an exemplary process sequence of registration of a new destination address with the destination address registration information 23 executed by the destination address registration part 32. The destination address registration part 32 receives an input of new destination address (step S10). Upon the receipt of input of new destination address, the destination address registration part 32 sets address type of the input destination address (step S11). As described above, either of internal address or external address may be set in response to the information entered by the administrator for the address type 23c. Alternatively, the destination address registration part 32 analyzes domain or the like of the input destination address, thereby allowing either internal address or external address to be set automatically.

As the address type is set, the destination address registration part 32 determines whether or not the address type is external address (step S12). When the address type is external address (when a result of step S12 is YES), the destination address registration part 32 sets an address responsible for external address in addition (step S13). Here, as described above, an e-mail address of a responsible person is set as the address responsible for external address based on information entered by the administrator. When the address type is internal address (when a result of step S12 is NO), the destination address registration part 32 does not execute the setting of the address responsible for external address.

The destination address registration part 32 then registers each of the destination address, the address type and the address responsible for external address set in each processing described above with the destination address registration information 23 stored in the storage device 20, respectively (step S14). Registration processing of destination address thus completes.

Returning to the block diagram shown in FIG. 3, the job execution control part 33 controls execution of a job specified by the logged-in user. The job execution control part 33 controls each of the scanner unit 16, the printer unit 17, the facsimile unit 18 and the network communication unit 19 as required, realizing execution of a job specified by a logged-in user. By way of example, when "SCAN to E-mail" is specified by a logged-in user, the job execution control part 33 activates the scanner unit 16, thereby controlling reading operation of a document. The job execution control part 33 then stores document data output from the scanner unit 16 into the memory 12 or the storage device 20. For "SCAN to E-mail," the e-mail transmission part 34 also comes into operation to function thereafter.

The e-mail transmission part 34 transmits an e-mail to destination address designated by the logged-in user. In case of "SCAN to E-mail," the e-mail transmission part 34 attaches document data generated by the scanner unit 16 by reading a document to an e-mail, and transmits the e-mail to the designated destination address. As illustrated in FIG. 3, the e-mail transmission part 34 includes the destination address identifying part 35, the address type determination part 36, the source setting part 37, the mail creation part 38 and the transmission part 39.

The destination address identifying part 35 reads the destination address registration information 23 stored in the storage device 20 and displays destination addresses in a list form on the display unit 14 of the operational panel 13. The destination address identifying part 35 identifies at least one destination address selected by the logged-in user from the destination addresses displayed in a list form. The destination address identifying part 35 then sets the identified destination address as an address to be stated in a destination address field of the e-mail.

The address type determination part 36 determines the address type of the destination address selected by the logged-in user. By referring to the address type 23c in the destination address registration information 23, the address type determination part 36 determines whether the destination address selected by the logged-in user is either internal address or external address.

The source setting part 37 sets information such as a source of the e-mail. In particular, the source setting part 37 sets address to be inserted in each of a source address field and a return address field of the e-mail transmitted to the destination address selected by the logged-in user. The source setting part 37 switches processing for setting the information of the source address and the return address of the e-mail, in response to the result of determination made by the address type determination part 36. As an example, when the destination address selected by the logged-in user is internal address, the source setting part 37 refers to the user information 22, and sets an e-mail address of the logged-in user as address to be inserted in each of the source address field and the return address field. When the destination address selected by the logged-in user is external address, the source setting part 37 refers to the destination address registration information 23, and sets an address responsible for external address registered corresponding to the destination address selected by the logged-in user as address to be inserted in each of the source address field and the return address field.

The mail creation part 38 creates the e-mail to be transmitted to the destination address selected by the logged-in user. The mail creation part 38 inserts the destination address set by the destination address identifying part 35 to the destination address field of the e-mail, and the address set by the source setting part 37 to the source address field and the return address field of the e-mail. In case of execution of "SCAN to E-mail," the mail creation part 38 attaches document data generated by the scanner unit 16 to the e-mail, thereby creating the e-mail to be transmitted.

The transmission part 39 transmits the e-mail created by the mail creation part 38. By controlling the network communication unit 19, the transmission part 39 outputs the e-mail to the mail server 3 through the network 4. As receiving the e-mail output by the image processing device 2, the mail server 3 transmits the e-mail to the destination address. If the destination address is internal address, the mail server 3 transmits the e-mail to one of the computers 5 corresponding to the destination address. If the destination address is external address, the mail server 3 transmits the e-mail to another mail server over the external network 9.

Figure 7:
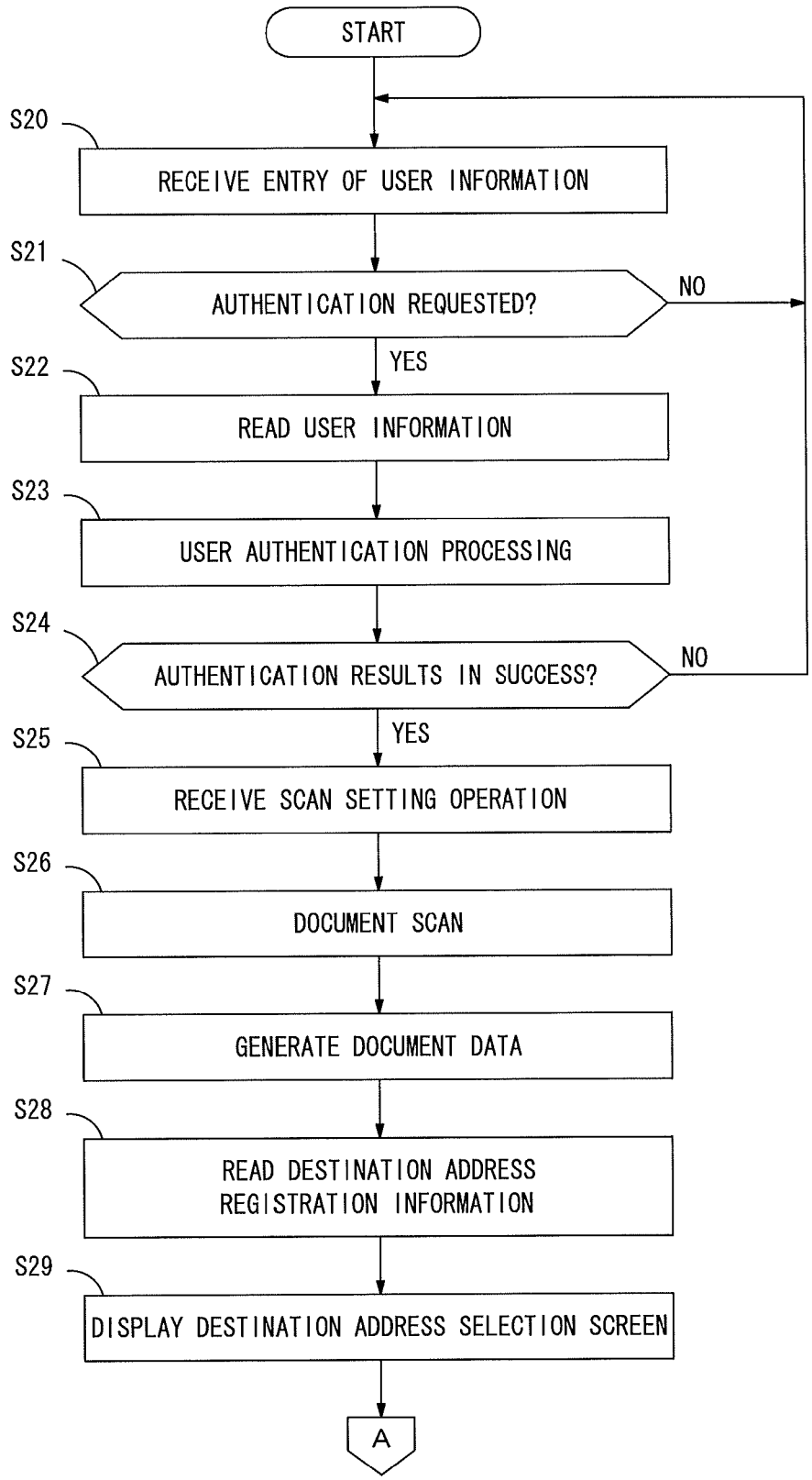
FIG. 7 is a flow diagram explaining an exemplary process sequence of processing executed by a controller of the image processing device.
Figure 8:
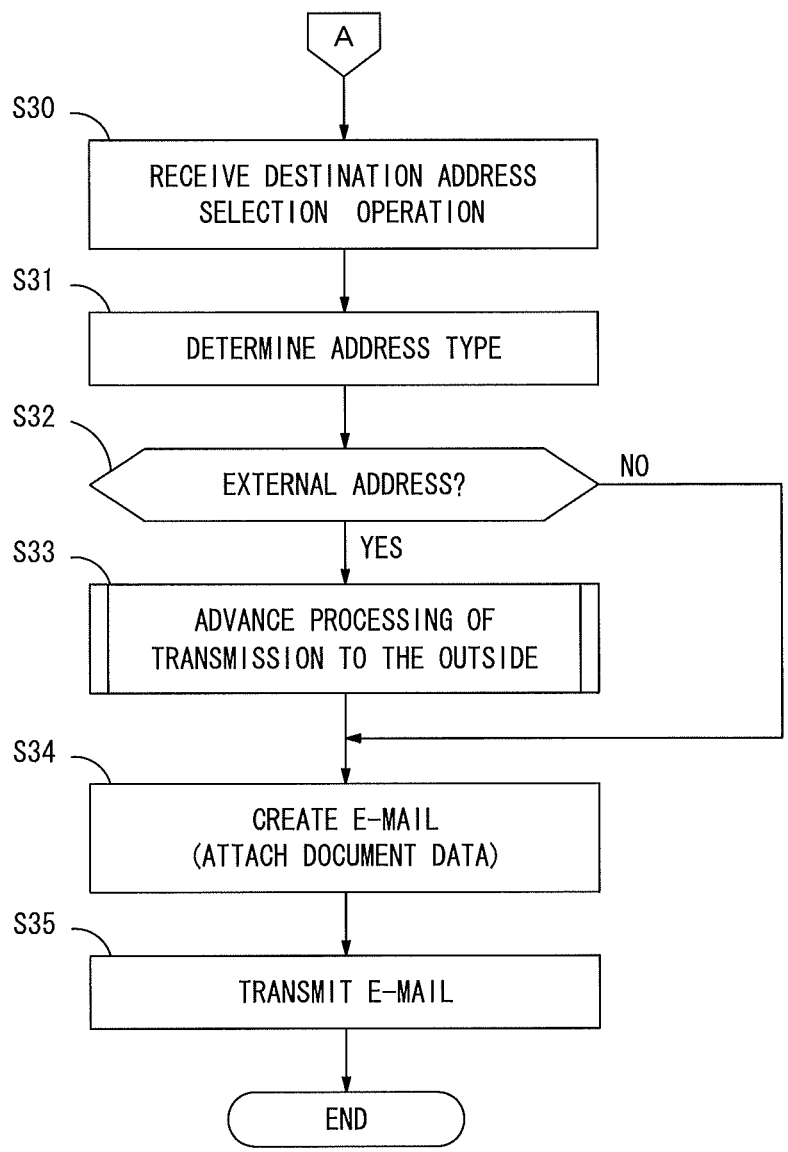
FIG. 8 is a flow diagram explaining an exemplary process sequence of processing executed by the controller of the image processing device.
Figure 9:
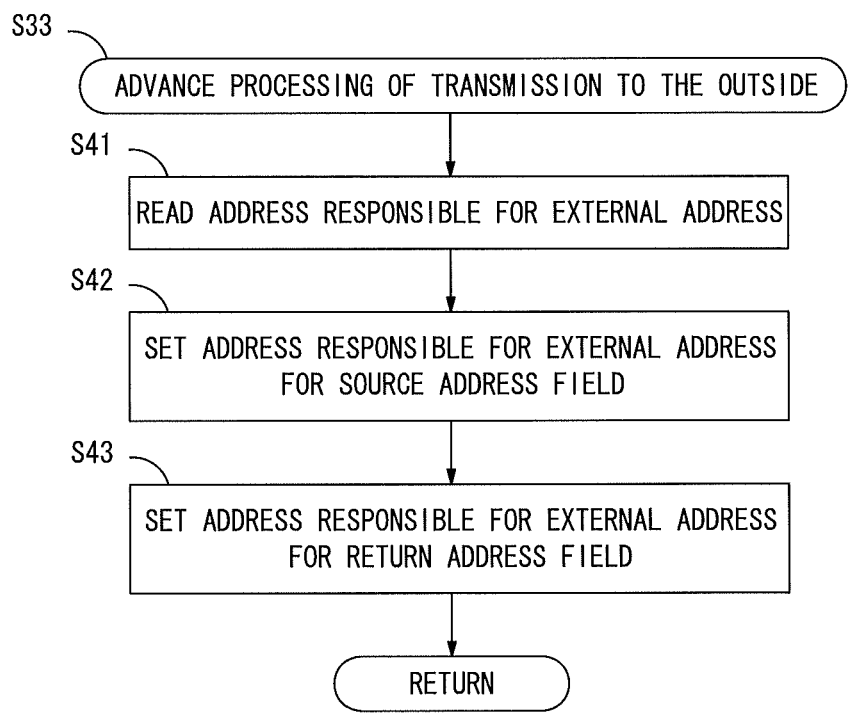
FIG. 9 is a flow diagram explaining the process sequence of advance processing of transmission to the outside in the first preferred embodiment in detail.

Next, the sequential operation in the image processing device 2 of transmitting the e-mail is explained with an example. FIGS. 7 to 9 are flow diagrams explaining an exemplary process sequence executed by the controller 10 in the information processing device 2. For this processing, an example when a user logs into the image processing device 2, specifies "SCAN to E-mail", and makes transmission operation of the e-mail is stated. In this processing, the user authentication part 31, the job execution control part 33 and the e-mail transmission part 34 described above come into operation to function in the controller 10, sequentially.

As the processing starts, the controller 10 first functions as the user authentication part 31. The controller 10 displays a screen for entry of user information, such as user ID and password, for execution of user authentication on the display part 14 of the operational panel 13, and receives entry operation of user information through the manipulation input unit 15 (step S20). Upon the entry of the user information, the controller 10 determines whether or not request for authentication has given by a user (step S21). If request for authentication is not given (when a result of step S21 is NO), the process returns to step S20 to receive entry operation of user information again. If request for authentication is given by the user (when a result of step S21 is YES), the controller 10 reads the user information 22 from the storage device 20 (step S22), and executes user authentication processing (step S23). User authentication is executed by searching whether or not a combination the same as the one of user ID and password and others entered through the operational panel 13 is registered in advance in the user information 22. When user authentication results in failure (when a result of step S24 is NO), the process returns to step S20.

On the other hand, when user authentication results in success (when a result of step S24 is YES), the controller 10 identifies a logged-in user and transits the image processing device 2 to a logged-in state. The controller 10 then receives scan setting operation made by the logged-in user (step S25). The scan setting operation is for configuring variety of settings as to reading operations of a document executed by the scanner unit 16. By way of example, setting operation of read resolution (for example, 200 dpi or 400 dpi), output data format (for example, format of, such as PDF, JPEG, TIFF), or the like is made. If necessary, setting for encryption of document data generated by the scanner unit 16, setting for adding electronic data of time stamp to document data, or setting for processing to synthesize document data and images or characters, such as an image of company name or logo, or characters of "confidential" or "critical document" is configured.

After the completion of the scan setting operation, the logged-in user gives an instruction to start scanning of a document. Accordingly, the controller 10 comes into operation to function as the job execution control part 33 to start scanning of a document by controlling the scanner unit 16 (step S26). At this point, settings entered at scan setting operation are applied to read resolution, output data format, and others. The controller 10 inputs a document image read from the document, and generates document data based on the document image (step S27). The document data generated here is stored into the memory 12 or into the storage device 20.

After document data is generated, the controller 10 then comes into operation to function as the e-mail transmission part 34. The controller 10 reads the destination address registration information 23 from the storage device 20 (step S28), and displays a destination address selection screen on the display unit 14 of the operational panel 13 (step S29). On the destination address selection screen, the destination address 23b registered in the destination address registration information 23 as shown in FIG. 5 is displayed in a list form. As a result, the logged-in user may select a destination address to which he or she would like to send the document data from the displayed list.

With reference to the flow diagram shown in FIG. 8, the controller 10 receives entry of user's operation of selection of destination address from the list of destination addresses displayed on the display unit 14 (step S30). After the selection operation, the controller 10 determines address type of the selected destination address by referring to the address type 23c in the destination address registration information 23 (step S31). So, it is determined that the destination address selected by the logged-in user is either internal address or external address. The controller 10 determines whether or not the destination address selected by the logged-in user is external address (step S32), and if the destination address is external address (when a result of step S32 is YES), the controller 10 executes an advance processing of transmission to the outside (step S33).

FIG. 9 is a flow diagram explaining the process sequence of the advance processing of transmission to the outside (step S33) in detail. When the destination address is external address, the controller 10 refers to the address responsible for external address 23d in the destination address registration information 23, thereby reading an address responsible for external address associated with the destination address selected by the logged-in user (step S41), and setting the read address responsible for external address as an address to be inserted to the source address field of the e-mail (step S42). The source address field is a field in which an address indicating source of the e-mail is stated. As an example, for e-mails generally used, "From" field in the header information corresponds to the source address field.

Moreover, the controller 10 sets the address responsible for external address read from the destination address registration information 23 as an address to be inserted to the return address field of the e-mail (step S43). In the return address field, an e-mail address to be addressed for return when replying the e-mail is stated. For an e-mail generally used for instance, "Reply-to" field in the header information corresponds to the return address field.

In the first preferred embodiment, when the destination address designated by the logged-in user is external address, the advance processing of transmission to the outside (step S33) as shown in FIG. 9 is executed. As a result, the address responsible for external address is set as an address to be inserted to the source address field and the return address field. The processing returns to the flow diagram shown in FIG. 8.

In contrast, when the destination address designated by the logged-in user is internal address (when a result of step S32 is NO), execution of the advance processing of transmission to the outside (step S33) is skipped. In such a case, the e-mail address of the logged-in user is set as an address to be inserted to the source address field and the return address field as well as the normal e-mail transmission processing.

Next, the controller 10 executes the e-mail creation processing (step S34). In this processing, address is inserted to each of the source address field, the destination address field and the return address field of the e-mail. The controller 10 then reads document data stored in the memory 12 or the storage device 20 and attaches the document data to the e-mail, thereby creating the e-mail to be transmitted to the destination address specified by the logged-in user. The controller 10 executes transmission of the e-mail created in step S34 (step S35). As this processing in step S35 is executed, the e-mail is transmitted to the destination address designated by the logged-in user.

It is assumed that the logged-in user would also like to transmit the document data generated in step S27 to another destination address. In that case, the same processing is executed also for another destination address after execution of the e-mail creation processing (step S34). In order to do so, the processing in step S28 to step S34 may repeatedly executed.

Figure 10:
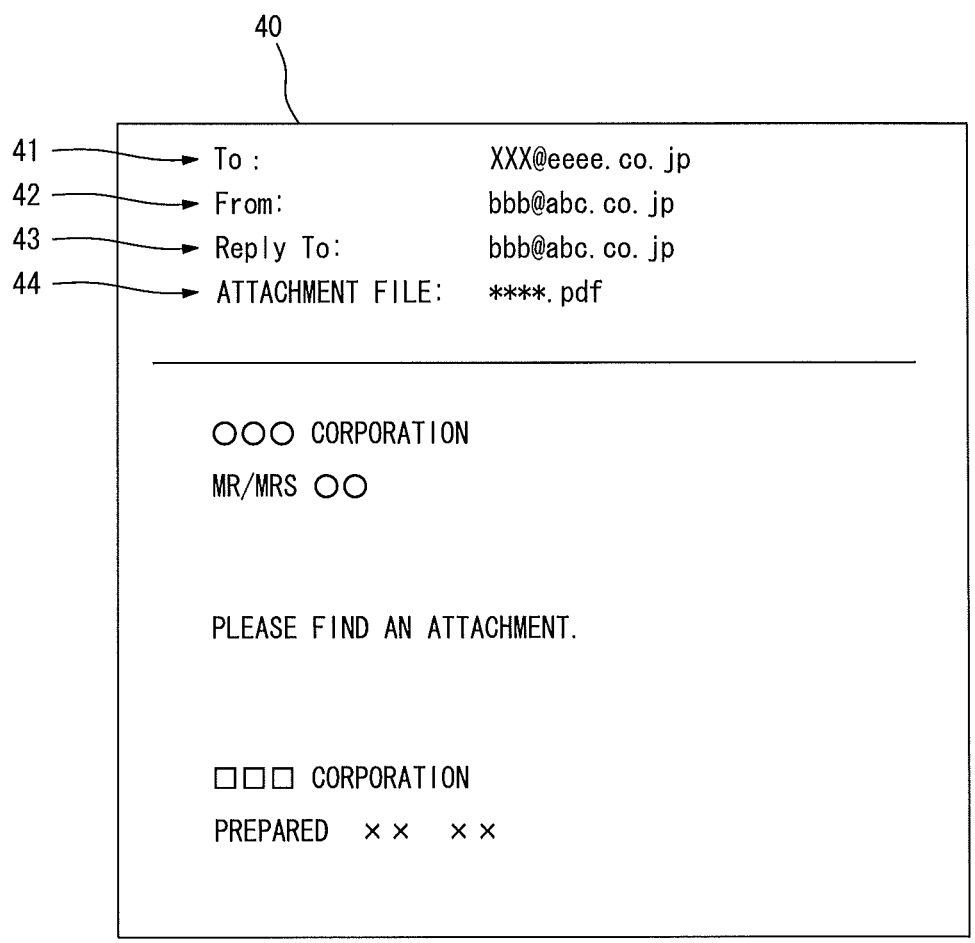
FIG. 10 is an example of an e-mail transmitted by the image processing device to external address in the first preferred embodiment.

FIG. 10 is an example of an e-mail transmitted by the image processing device 2 when the destination address designated by the logged-in user is external address. As illustrated in FIG. 10, in an e-mail 40 transmitted by the image processing device 2 to an external address, a destination address (XXX@eeee.co.jp) selected by the logged-in user from the destination address registration information 23 is set for a destination address field 41. For a source address field 42, an address responsible for external address (bbb@abc.co.jp) that is registered in the destination address registration information 23 (see FIG. 5) in response to the destination address (XXX@eeee.co.jp), is set. Also for a return address field 43, the address responsible for external address (bbb@abc.co.jp) that is registered in the destination address registration information 23 (see FIG. 5) in response to the destination address (XXX@eeee.co.jp), is set. Document data (****.pdf) is attached as an attachment file 44 to the e-mail 40 shown in FIG. 10.

When, for example, user A registered in the user information 22 (see FIG. 4) is logging into the image processing device 2, the user A gives an instruction for "SCAN to E-mail." The user A then selects the destination address (XXX@eeee.co.jp) registered in the destination address registration information 23 (see FIG. 5). The destination address is external address, so the image processing device 2 creates the e-mail 40 as shown in FIG. 10 automatically, and transmits the e-mail 40 thereby created to the destination address (XXX@eeee.co.jp) selected by the user A.

As explained above, in the first preferred embodiment, when address type in the address type 23c associated with the destination address designated by the logged-in user, is external address, the e-mail transmission part 34 reads the address responsible for external address 23d associated with the designated destination address. The e-mail transmission part 34 creates the e-mail 40 in which the address responsible for external address 23d is set for the source address field and the return address field, and transmits the e-mail 40 thereby created to the designated destination address.

Therefore, in regard to operations in the office, it is assumed that a responsible person who communicates directly with the outside the office is set. Even when the user A who is different from the responsible person sends the e-mail with document data attachment to outside the office, the e-mail in which the address of the responsible person is set for the source address field and the return address field is transmitted to the destination address. More specifically, when address type information associated with the destination address designated by the user A is external address, the e-mail in which an address responsible for external address associated with the specified destination address is set for the source address field and the return address field is created, and the e-mail thereby created is transmitted to the designated destination address. As a result, the responsible person is not required to actually making operation to transmit the e-mail, or to have a request for sending e-mail. So, it results in reducing operation load of the responsible person and in preventing concentration of requests for sending the e-mail to the responsible person.

Second Preferred Embodiment

A second preferred embodiment of the present invention is described next. In the above described first preferred embodiment, when, for example, the user A different from the responsible person made an operation to send the e-mail with document data attachment, to outside the office, the e-mail in which an e-mail address of the responsible person is set for the source address field and the return address field is transmitted. In the first preferred embodiment, however, the responsible person him/herself may not be able to recognize the fact of transmission of the e-mail. In the second preferred embodiment, even when the e-mail is transmitted in response to an operation made by a user different from the responsible person, the responsible person may check the transmitted e-mail. Each configuration of the information processing system 1 and the image processing device 2 of the second preferred embodiment is the same as that of the first preferred embodiment.

According to the second preferred embodiment, the process sequence of transmission of the e-mail in the image processing device 2 is the same as that of the first preferred embodiment explained in FIG. 7 and FIG. 8. In the second preferred embodiment, detail of concrete processing of the advance processing of transmission to the outside (step S33) shown in FIG. 8 differs from that of the first preferred embodiment. Details of the advance processing of transmission to the outside (step S33) in the second preferred embodiment is explained herein below.

Figure 11:
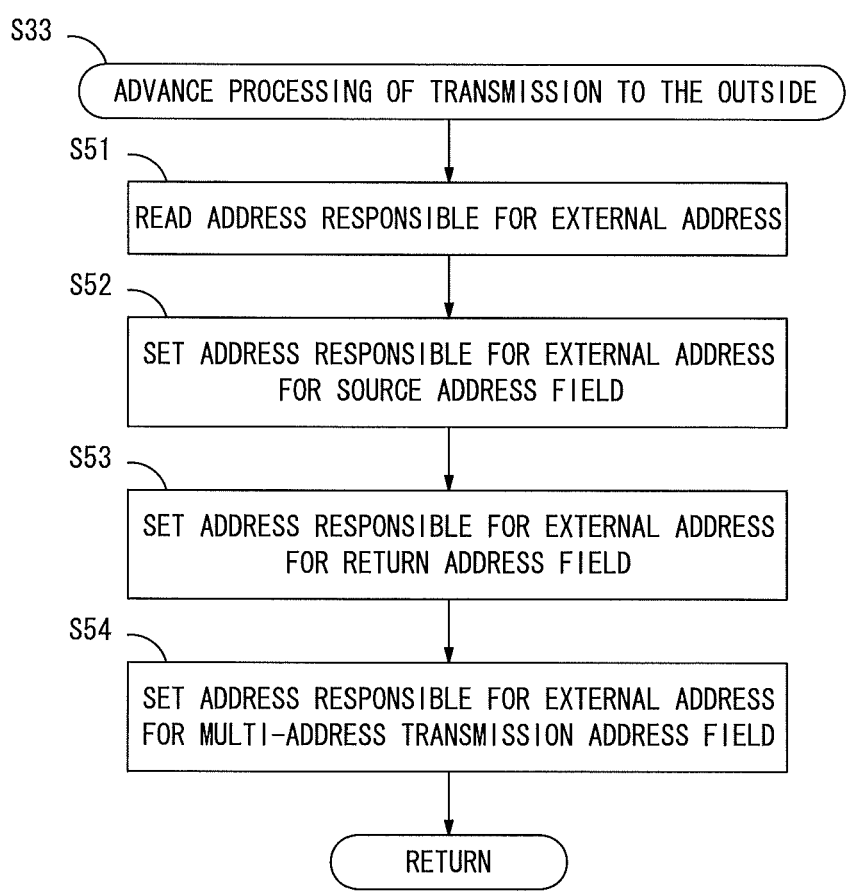
FIG. 11 is a flow diagram explaining the process sequence of advance processing of transmission to the outside in the second preferred embodiment in detail.

FIG. 11 is a flow diagram explaining the process sequence of the advance processing of transmission to the outside (step S33) in the second preferred embodiment in detail. When the destination address is external address, the controller 10 refers to the address responsible for external address 23d in the destination address registration information 23, thereby reading the address responsible for external address associated with the destination address selected by the logged-in user (step S51). The controller 10 then sets the address responsible for external address thereby read as an address to be inserted to the source address field of the e-mail (step S52). The controller 10 also sets the address responsible for external address read from the destination address registration information 23 as an address to be inserted to the return address field of the e-mail (step S53). Additionally, the controller 10 sets the address responsible for external address read from the destination address registration information 23 as an address to be inserted to a multi-address transmission address field of the e-mail (step S54). In the multi-address transmission address field, at least one address to be sent besides the destination address (TO) for transmission of the e-mail is set. By way of example, for the e-mail generally used, the multi-address transmission address field corresponds to a field "CC" in header information.

As described, in the second preferred embodiment, when the destination address designated by the logged-in user is external address, the advance processing of transmission to the outside (step S33) as shown in FIG. 11 is executed. As a result, the address responsible for external address is set not only for the source address field and the return address field, but also for the multi-address transmission address field.

Figure 12:
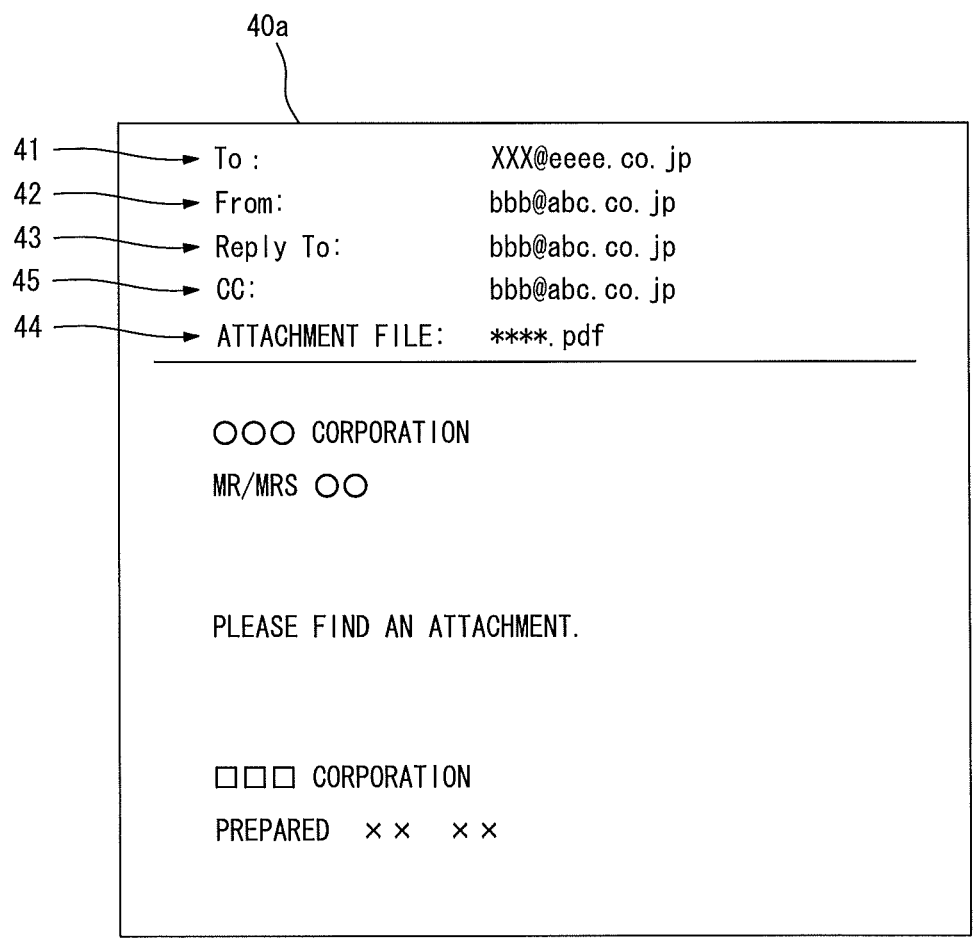
FIG. 12 is an example of an e-mail transmitted by the image processing device to external address in the second preferred embodiment.

FIG. 12 is an example of an e-mail transmitted from the image processing device 2 when the destination address designated by the logged-in user is external address in the second preferred embodiment. As illustrated in FIG. 12, in an e-mail 40a transmitted from the image processing device 2 to external address, a destination address (XXX@eeee.co.jp) selected by the logged-in user from the destination address registration information 23 is set for the destination address field 41. For the source address field 42, an address responsible for external address (bbb@abc.co.jp) registered in the destination address registration information 23 (see FIG. 5) in association with the destination address (XXX@eeee.co.jp) is set. Also for the return address field 43, the address responsible for external address (bbb@abc.co.jp) registered in the destination address registration information 23 (see FIG. 5) in association with the destination address (XXX@eeee.co.jp) is set. In addition, for a multi-address transmission address field 45, the address responsible for external address (bbb@abc.co.jp) registered in the destination address registration information 23 (see FIG. 5) in association with the destination address (XXX@eeee.co.jp) is set. Document data (****.pdf) is attached to the e-mail 40a shown in FIG. 12 as an attachment file 44.

As for instance, it is assumed that the image processing device 2 is logged in by the user A registered in the user information 22 (see FIG. 4). Then, an instruction for "SCAN to E-mail" is given by the user A, and the destination address (XXX@eeee.co.jp) registered in the destination address registration information 23 (see FIG. 5) is selected. In such case, the destination address is external address, so the image processing device 2 creates the e-mail 40a as illustrated in FIG. 12 automatically and transmits the e-mail 40a thereby created to the destination address (XXX@eeee.co.jp) selected by the user A. Here, the address responsible for external address (bbb@abc.co.jp) is set for the multi-address transmission address field; therefore the e-mail 40a is also going to be transmitted to the responsible person.

According to the second preferred embodiment, when transmitting the e-mail in which the address responsible for external address is set for the source address field and the return address field to the destination address designated by the logged-in user, the e-mail transmission part 34 sets the address responsible for external address for the multi-address transmission address field as well and transmits the e-mail.

In the second preferred embodiment, in regard to operations in the office, it is assumed that the responsible person who communicates directly with the outside the office is set. Even when the user A different from the responsible person makes an operation to send the e-mail with attaching document data to the outside, the responsible person may receive the e-mail which is delivered to multiple addresses at the same time. It allows the responsible person to recognize the fact of transmission of the e-mail.

Third Preferred Embodiment

A third preferred embodiment of the present invention is described next. According to the first and the second preferred embodiment described above, an external person in charge who received the transmitted e-mail makes a reply to the received e-mail, for example, the reply mail is sent to the e-mail address of the responsible person. As receiving the reply mail, the responsible person needs to identify the logged-in user (a person who actually made an operation to send) who actually sent document data, and tell that he or she has got the reply mail. In the third preferred embodiment, when the reply mail is sent in response to the e-mail transmitted by the image processing device 2 as described above, the operation load of the responsible person for informing of receipt of the reply mail can be reduced. Each configuration of the information processing system 1 and the image processing device 2 of the third preferred embodiment is the same as that of the first preferred embodiment.

According to the third preferred embodiment, the process sequence of transmission of the e-mail by the image processing device 2 is the same as that of the first preferred embodiment explained in FIG. 7 and FIG. 8. In the third preferred embodiment, detail of concrete processing of the advance processing of transmission to the outside (step S33) shown in FIG. 8 differs from that of the first preferred embodiment. Details of the advance processing of transmission to the outside (step S33) in the third preferred embodiment is explained herein below.

Figure 13:
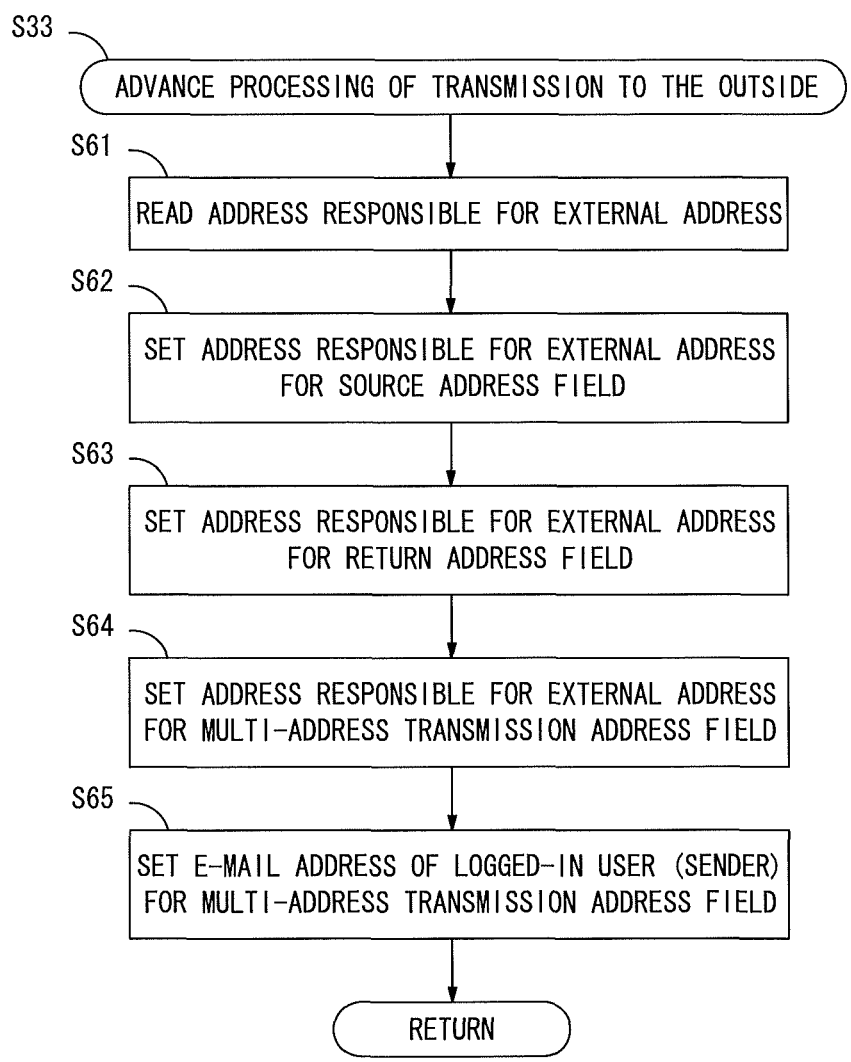
FIG. 13 is a flow diagram explaining the process sequence of advance processing of transmission to the outside in the third preferred embodiment in detail.

FIG. 13 is a flow diagram explaining the process sequence of the advance processing of transmission to the outside (step S33) in the third preferred embodiment in detail. As the destination address is external address, the controller 10 refers to the address responsible for external address 23d in the destination address registration information 23, thereby reading an address responsible for external address associated with the destination address selected by the logged-in user (step S61), and setting the read address responsible for external address as an address to be inserted to the source address field of the e-mail (step S62). The controller 10 also sets the address responsible for external address read from the destination address registration information 23 as an address to be inserted to the return address field of the e-mail (step S63), and sets the same as an address to be inserted to the multi-address transmission address field of the e-mail (step S64). In addition, the controller 10 of the third preferred embodiment reads the e-mail address 22d of the logged-in user by referring to the user information 22, and sets the read e-mail address as an address to be inserted to the multi-address transmission address field of the e-mail (step S65).

In the third preferred embodiment as described above, as the destination address designated by the logged-in user is external address, the advance processing of transmission to the outside (step S33) is executed. Therefore, the address responsible for external address is set for the destination address field, the return address field and the multi-address transmission address field. Additionally, the e-mail address of the logged-in user is set for the multi-address transmission address field.

FIG. 14 is an example of the e-mail transmitted from the image processing device 2 when the destination address designated by the logged-in user is external address in the third preferred embodiment. As shown in FIG. 14, in an e-mail 40b transmitted from the image processing device 2 to external address, the destination address (XXX@eeee.co.jp) selected by the logged-in user from the destination address registration information 23 is set in the destination address field 41. In the source address field 42 and the return address field 43, the address responsible for external address (bbb@abc.co.jp) registered in the destination address registration information 23 (see FIG. 5) in response to the destination address (XXX@eeee.co.jp) is set. Furthermore, the address responsible for external address (bbb@abc.co.jp) registered in the destination address registration information 23 (see FIG. 5) in response to the destination address (XXX@eeee.co.jp), and an e-mail address (aaa@abc.co.jp) of the logged-in user (user A) are set in the multi-address transmission address field 45. Document data (****.pdf) shown in FIG. 14 is attached to the e-mail 40b as the attachment file 44.

By way of example, when the user A registered in the user information 22 (see FIG. 4) logs into the image processing device 2, the user A specifies "SCAN to E-mail" and selects the destination address (XXX@eeee.co.jp) registered in the destination address registration information 23 (see FIG. 5). The destination address is external address, so the image processing device 2 creates the e-mail 40b as shown in FIG. 14 automatically, and transmits the e-mail 40b to the destination address (XXX@eeee.co.jp) selected by the user A. The address responsible for external address (bbb@abc.co.jp) and the e-mail address (aaa@abc.co.jp) of the user A, a sender, are set for the multi-address transmission address field. Therefore, the e-mail 40b is delivered to both the responsible person and the user A.

According to the third preferred embodiment, a user's address associated with the logged-in user (sender) who makes an operation to send the e-mail is identified. When transmitting the e-mail in which an address responsible for external address is set in the source address field and the return address field, to the destination address designated by the logged-in user, the e-mail transmission part 34 sets the user's address for the multi-address transmission address field, and transmits the e-mail.

In the third preferred embodiment, as an example, an external person receives the e-mail transmitted by the image processing device 2. The external person then makes an operation to send a reply mail in response to the received e-mail with remaining addresses appeared in the multi-address transmission address field. As a result, the reply mail may be delivered to the logged-in user (sender) who made the operation to send the e-mail. Thus, the responsible person is not required to inform of the receipt of the reply mail to the sender. As a result, the operation load of the responsible person may be reduced.

In addition, in the third preferred embodiment, even when, for instance, the external person who received the e-mail transmitted by the image processing device 2 makes an operation to send a reply mail in response to the e-mail without addresses appeared in the multi-address transmission address field, the operation load of the responsible person may still be reduced. This is because, in the above-described first and second preferred embodiment, as receiving a reply mail responding to the e-mail the image processing device 2 transmitted to external address, the responsible person needs to make work, such as referring to an operation history or the like of the image processing device 2, to check that the reply mail is responding to which e-mail sent by whom. In contrast, in the third preferred embodiment, the e-mail address of the logged-in user (sender) is added to the multi-address transmission address field when the e-mail is transmitted by the image processing device 2 to external address. As a result, as receiving a reply mail, the responsible person is not necessary to make reference to the operation history or the like of the image processing device 2. By referring to the original mail to which the reply mail the responsible person received is responding, the responsible person may check that the reply mail is responding to the e-mail sent by whom. Therefore, the operation load may be reduced.

In the third preferred embodiment, an example of setting both the address responsible for external address and the e-mail address of the logged-in user for the multi-address transmission address field is explained, however the address responsible for external address isn't always necessary to be set.

Forth Preferred Embodiment

A forth preferred embodiment of the present invention is described next. In the forth preferred embodiment, an example of gaining approval of the person in charge of support when an e-mail is transmitted to an external address designated by the logged-in user (sender), is explained. Each configuration of the information processing system 1 and the image processing device 2 of the forth preferred embodiment is the same as that of the first preferred embodiment. Difference between the forth preferred embodiment and the first preferred embodiment is explained herein below.

Figure 15:
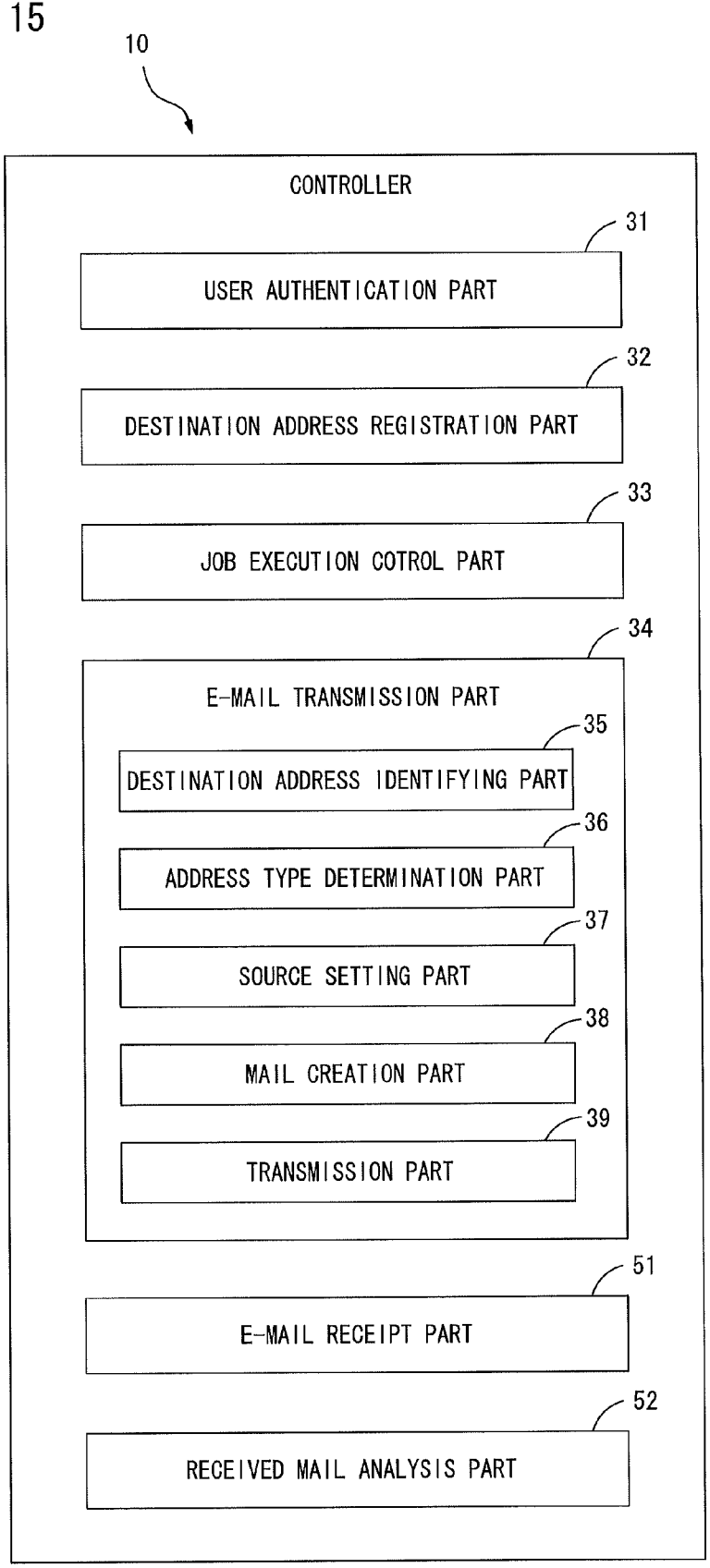
FIG. 15 is a block diagram showing the processing section relating to the function of transmitting e-mail in the forth preferred embodiment.

FIG. 15 is a block diagram showing a processing section relating to a function of transmitting the e-mail as a part of various types of functions of the controller 10 realized by read and execution of the program 21 by the CPU 11.

As illustrated in FIG. 15, in the forth preferred embodiment, the controller 10 of the image processing device 2 functions as the user authentication part 31, the destination address registration part 32, the job execution control part 33, the e-mail transmission part 34, a e-mail receipt part 51 and a received mail analysis part 52. The user authentication part 31, the destination address registration part 32, the job execution control part 33 and the e-mail transmission part 34 are the same as those explained in the first preferred embodiment. For transmission of the e-mail, the e-mail transmission part 34 of the forth preferred embodiment, however, may set the e-mail address of the image processing device 2 itself in both the source address field and the return address field, and transmits the e-mail.

The e-mail receipt part 51 receives an e-mail of which the e-mail address of the image processing device 2 itself is set as destination address. After receiving the e-mail addressed to itself, the e-mail receipt part 51 outputs the received mail to the received mail analysis part 52.

The received mail analysis part 52 analyzes the e-mail received by the e-mail receipt part 51. The received mail analysis part 52 checks whether or not an e-mail received by the e-mail receipt part 51 is a reply mail. If the e-mail is a reply mail, the received mail analysis part 52 specifies the e-mail is responding to which e-mail among transmitted e-mails. In general, in the header information of e-mail, unique identification information (message ID) is given, for example. In the header information of a reply mail, the unique identification information (message ID) of the original mail is included. The received mail analysis part 52 extracts identification information included in the header information and the like of the received mail, and specifies that the received mail is responding to which e-mail among e-mails the e-mail transmission part 34 transmitted.

When the destination address selected by the logged-in user is external address, the e-mail transmission part 34 of the forth preferred embodiment transmits an e-mail for approval to the address responsible for external address before transmitting the e-mail to the external address, thereby gaining approval of the responsible person. As receiving the reply mail responding the e-mail for approval, transmission of the e-mail is considered as approved by the responsible person. The e-mail transmission part 34 then transmits the e-mail to the destination address the logged-in user selected. As explained in the first to the third preferred embodiment, the e-mail transmission part 34 sets the address responsible for external address for the source address field and the return address field, and for the multi-address transmission address field if necessary.

According to the forth preferred embodiment, the process sequence of transmission of the e-mail by the image processing device 2 is the same as that of the first preferred embodiment explained in FIG. 7 and FIG. 8. In the forth preferred embodiment, detail of concrete processing of the advance processing of transmission to the outside (step S33) shown in FIG. 8 differs from that of the first preferred embodiment. Details of the advance processing of transmission to the outside (step S33) in the forth preferred embodiment is explained herein below.

Figure 16:
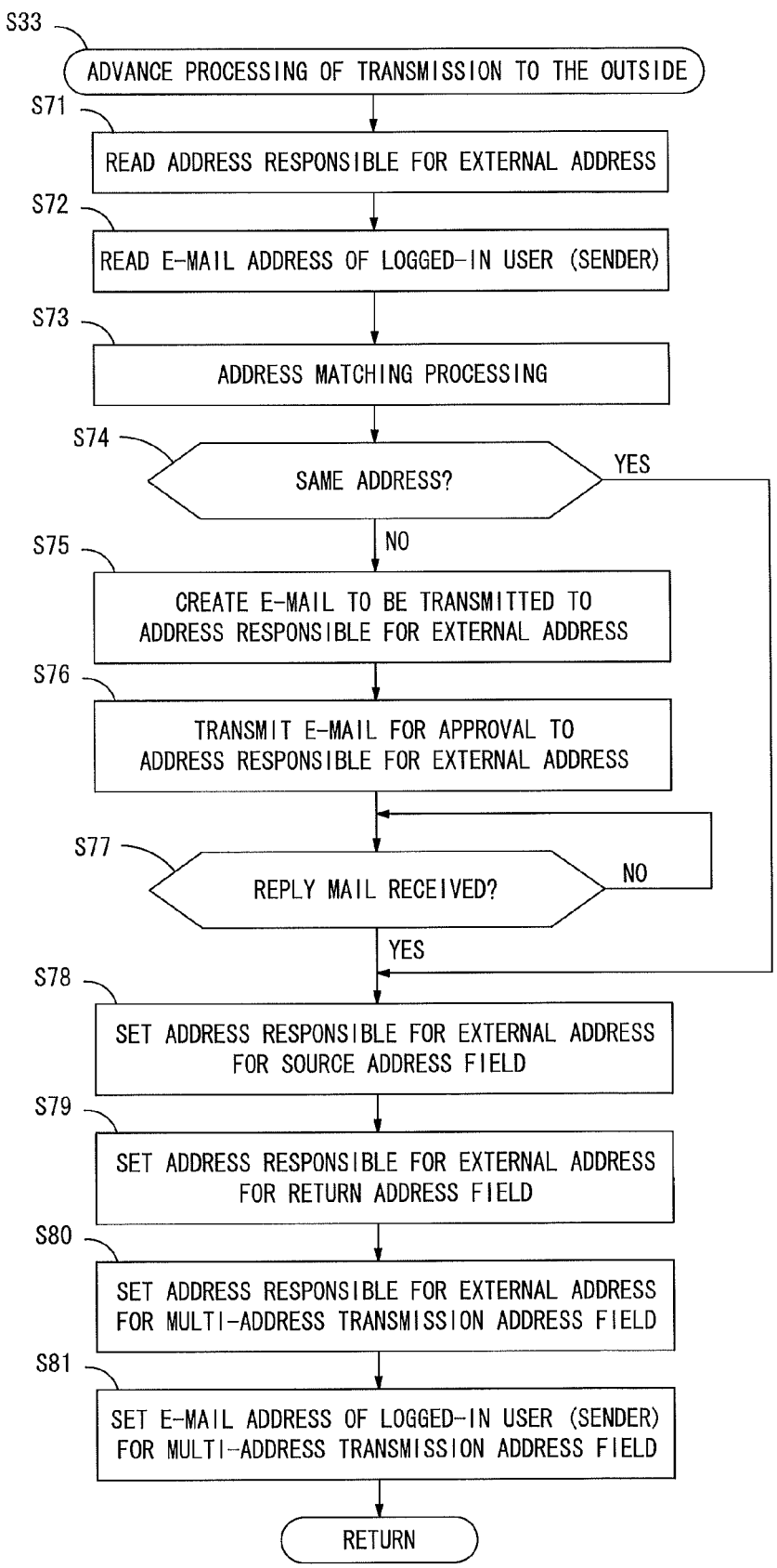
FIG. 16 is a flow diagram explaining the process sequence of advance processing of transmission to the outside in the forth preferred embodiment in detail.

FIG. 16 is a flow diagram explaining the detailed process sequence of the advance processing of transmission to the outside (step S33) in the forth preferred embodiment. When the destination address is external address, the controller 10 reads the address responsible for external address associated with the destination address selected by the logged-in user by referring to the address responsible for external address 23d in the destination address registration information 23 (see FIG. 5) (step S71). The controller 10 also reads the e-mail address 22d registered for the logged-in user (sender) by referring to the user information 22 (see FIG. 4) (step S72). The controller 10 then executes address matching processing to compare the address responsible for external address with the e-mail address of logged-in user (step S73), and determines whether or not the logged-in user and the responsible person are the same person (step S74). That is, if those two addresses are the same as the result of the address matching processing, it proves that the logged-in user and the responsible person are the same person. If two addresses are not the same as the result of the address matching processing, it is proved that the logged-in user and the responsible person are not the same person.

If the addresses are not the same as the result of the address matching processing (when a result of step S74 is NO), the controller 10 creates the e-mail for approval addressed to the address responsible for external address (step S75). The address responsible for external address is set in the destination address field of the e-mail for approval created here, and an e-mail address of the image processing device 2 is set in the source address field and the return address field. So, the e-mail for approval with document data stored in the memory 12 or the storage device 20 attachment is created.

The controller 10 then transmits the e-mail for approval created in step S75 to the address responsible for external address (step S76). Thus, the responsible person may receive the e-mail for approval with document data attachment to check the content and the others of document data which is planned to be sent, before the e-mail is actually sent to the external address. When approving to send to the external address, the responsible person should make an operation to send a reply mail in response to the received e-mail for approval.

After transmitting the e-mail to the address responsible for external address, the controller 10 is put into a waiting state for receipt of the reply mail from the responsible person (step S77). As receiving the reply mail responding to the e-mail for approval, sent by the responsible person (when a result of step S77 is YES), the controller 10 specifies the e-mail for approval transmitted to the responsible person from identification information and others contained in header information and the like of the reply mail, and executes follow-on processing (step S78 to step S81) to transmit the e-mail to the destination address selected by the logged-in user.

In contrast, if the addresses are the same as the result of the address matching processing (when a result of step S74 is YES), above-described processing in step S75 to step S77 is skipped. In this case, execution of the approval processing by the responsible person is not needed, so the processing moves on to follow-on processing (step S78 to step S81) to transmit the e-mail to the destination address selected by the logged-in user (the responsible person).

When transmitting the e-mail to the destination address selected by the logged-in user, the controller 10 sets the address responsible for external address for the source address field (step S78), and the same for the return address field (step S79). Additionally, the controller 10 sets the address responsible for external address for the multi-address transmission address field (step S80), and sets the e-mail address of the logged-in user (sender) for the multi-address transmission address field (step S81). The e-mail with document data attachment is then created, and is transmitted to the destination address selected by the logged-in user.

Figure 17:
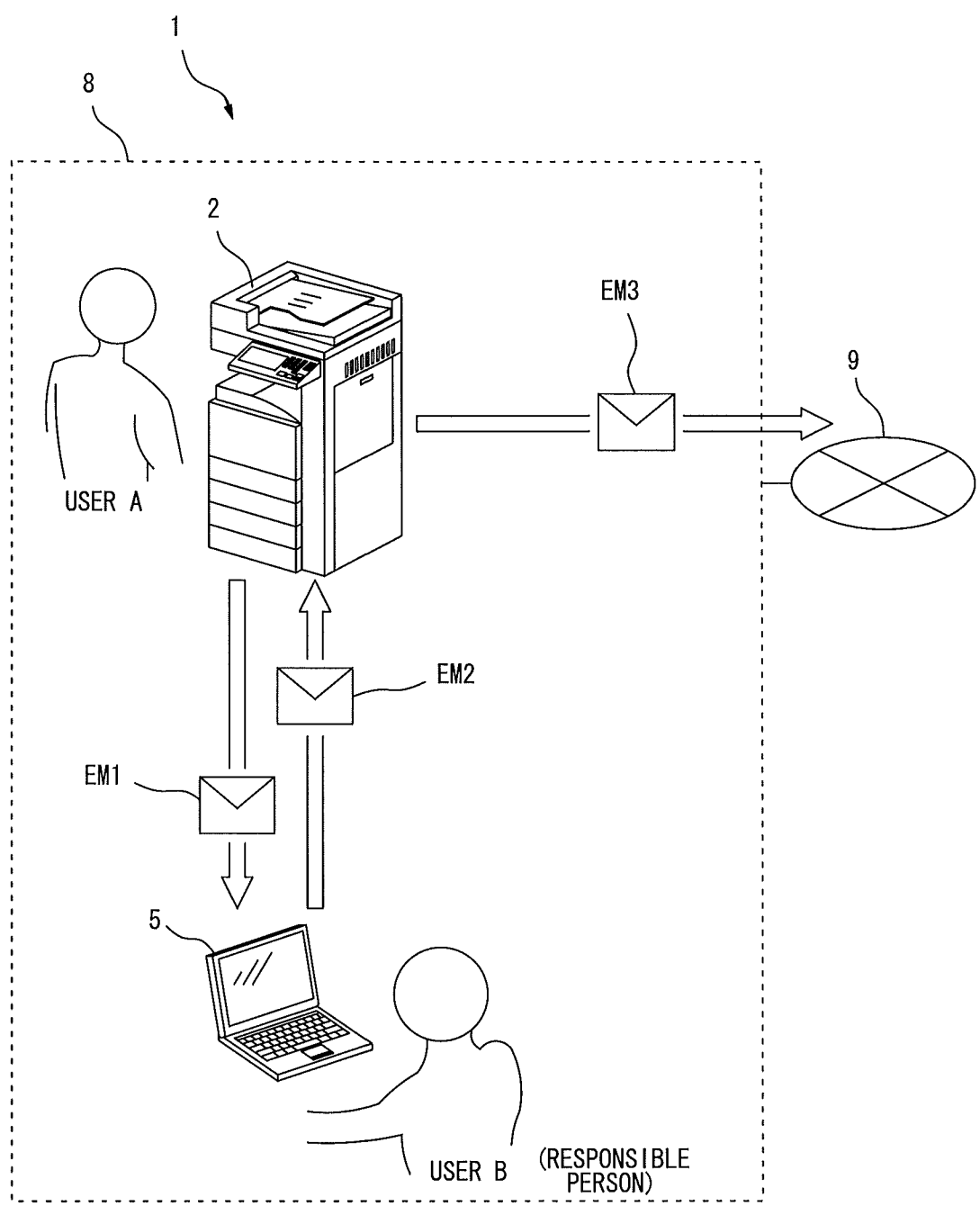
FIG. 17 is an example of an e-mail transmitted by the image processing device to external address in the forth preferred embodiment.

FIG. 17 is an exemplary transmission of the e-mail in the forth preferred embodiment. As shown in FIG. 17, in the forth preferred embodiment, when the user A logs into the image processing device 2 to make an operation to designate external address and send an e-mail to the external address, the image processing device 2 first transmits an e-mail for approval EM1 to user B who is a responsible person for the external address the user A designated. The user B receives the e-mail for approval EM1 with one of the computers 5 allocated to him or her, for example, thereby being able to check the content and the like of document data. If the user B denies sending the e-mail to the external address, he or she should not make a reply to the e-mail for approval EM1. If the user B approves sending the e-mail to the external address, he or she should make an operation to send a reply mail EM2 responding to the e-mail for approval EM1 received with one of the computers 5. The reply mail EM2 can be a blank e-mail message.

In response to receipt of the reply mail EM2 responding to the e-mail for approval EM1 which was transmitted to the user B who is the responsible person, the image processing device 2 next specifies a transmission job of e-mail specified by the user A who is the logged-in user based on the reply mail EM2. The transmission job of e-mail is considered as approved by the user B who is the responsible person by the receipt of the reply mail EM2, and an e-mail EM3 is transmitted to the external address designated by the user A. The content of the e-mail EM3 transmitted here is the same as the one of the e-mail 40b shown in the FIG. 14, for instance. The same content as that of the e-mail shown in FIG. 10 or FIG. 12 may also be transmitted.

As described herein above, the image processing device 2 of the forth preferred embodiment determines whether or not a user's address corresponding to a logged-in user who makes an operation of transmission of the e-mail and an address responsible for external address are the same. It is assumed that the user's address and the address responsible for external address are not the same. In such a case, the e-mail transmission part 34 transmits the e-mail for approval to the address responsible for external address before transmitting the e-mail to the destination address (external address) the logged-in user designated, and the responsible person checks the e-mail for approval addressed to him or her. Consequently, the responsible person is allowed to perform an operation to confirm whether or not to approve transmission of the e-mail to the destination address (external address) designated by the logged-in user efficiently.

The image processing device 2 of the forth preferred embodiment is capable of receiving an e-mail addressed to itself. As receiving the reply mail to the e-mail for approval, transmission of the e-mail is considered as approved by the responsible person. So, the e-mail transmission part 34 transmits the e-mail to the destination address the logged-in user designated. Therefore, as the responsible person makes operation to make a reply to the e-mail for approval, the e-mail is transmitted to the destination address that the logged-in user designated. As a result, the confirmation operation of the responsible person becomes extremely easy, resulting in reduction of operation load.

Fifth Preferred Embodiment

A fifth preferred embodiment of the present invention is described next. Like in the forth preferred embodiment, in the fifth preferred embodiment, an example of having approval of the responsible person when the e-mail is transmitted to external address the logged-in user (sender) designated is explained. According to the fifth preferred embodiment, if processing of document data is instructed when the responsible person gives approval, the image processing device 2 processes document data based on the instruction of the responsible person. The processed document data is attached to the e-mail, and the e-mail is transmitted to external address the logged-in user (sender) designated. Each configuration of the information processing system 1 and the image processing device 2 of the fifth preferred embodiment is the same as that of the first preferred embodiment. Difference between the one explained in the fifth preferred embodiment and the one in the first preferred embodiment is explained herein below.

Figure 18:
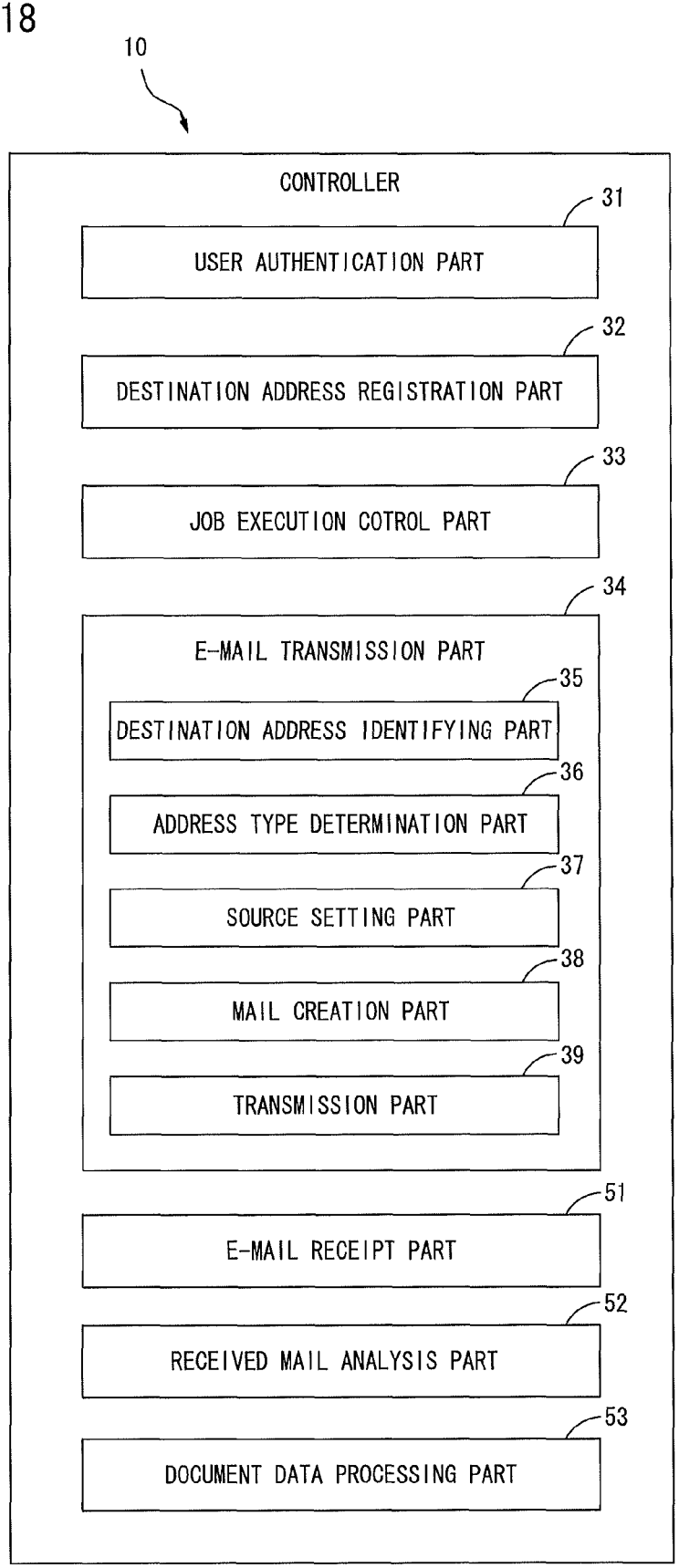
FIG. 18 is a block diagram showing the processing section relating to the function of transmitting e-mail in the fifth preferred embodiment.

FIG. 18 is a block diagram showing a processing section relating to a function of transmitting the e-mail as a part of various types of functions of the controller 10 realized by read and execution of the program 21 by the CPU 11 of the image processing device 2.

As shown in FIG. 18, in the fifth preferred embodiment, the controller 10 of the image processing device 2 functions as the user authentication part 31, the destination address registration part 32, the job execution control part 33, the e-mail transmission part 34, the e-mail receipt part 51, the received mail analysis part 52 and a document data processing part 53. The user authentication part 31, the destination address registration part 32, the job execution control part 33 and the e-mail transmission part 34 of those processing parts are the same as those explained in the first preferred embodiment. The e-mail receipt part 51 and the received mail analysis part 52 are the same as those explained in the forth preferred embodiment. The e-mail transmission part 34 of the fifth preferred embodiment, however, may set the e-mail address of the image processing device 2 for both the source address field and the return address field, and transmit the e-mail.

The e-mail receipt part 51 receives the e-mail in which the e-mail address of the image processing device 2 is set for the destination address field. Upon receipt of the e-mail addressed to itself, the e-mail receipt part 51 outputs the received mail to the received mail analysis part 52.

The received mail analysis part 52 analyzes e-mail that the e-mail receipt part 51 received. The received mail analysis part 52 checks whether or not the e-mail which the e-mail receipt part 51 received is a reply mail. When the e-mail is a reply mail, the received mail analysis part 52 specifies the e-mail is responding to which e-mail among e-mails that the e-mail transmission part 34 transmitted.

The received mail analysis part 52 of the fifth preferred embodiment analyzes text of the received mail and determines whether or not the responsible person has specified processing of document data. The processing of document data is, for example, processing of, such as encrypting document data, adding electronic data of time stamp indicating its creation, update or the like to document data, synthesizing image of company name, company logo or the like and document data and synthesizing characters, image and others representing "confidential", "important document" or the like and document data. If processing of the document data is specified by the responsible person, the received mail analysis part 52 identifies what kind of processing is specified by the responsible person. By way of example, when extracting a string of characters, "encryption," from text of the received mail, the received mail analysis part 52 identifies that encryption of document data is specified. When extracting a string of characters, "time stamp," from text of the received mail, the received mail analysis part 52 identifies that addition of electronic data of time stamp to document data is specified. When extracting a string of characters, "company name" or "logo," from text of the received mail, the received mail analysis part 52 identifies that processing of synthesizing image of company name, company logo or the like and document data is specified. Furthermore, when extracting a string of characters, such as "confidential" or "important document," from text of the received mail, the received mail analysis part 52 identifies that processing of synthesizing characters, image and others of extracted characters and document data.

When processing of document data is specified in the received mail sent by the responsible person as the result of analysis executed by the received mail analysis part 52 as described above, the document data processing part 53 executes the specified processing. So, the document data processing part 53 reads document data stored in the memory 12 or the storage device 20 and executes specified processing of the document data. If, for example, encryption of document data is specified, document data read from the memory 12 or the storage device 20 is processed by the document data processing part 53 in accordance with predetermined encryption processing. If other processing is specified, the document data processing part 53 executes processing that the responsible person specified.

As well as the forth preferred embodiment, the e-mail transmission part 34 of the fifth preferred embodiment transmits the e-mail for approval to the address responsible for external address before transmitting to external address when destination address selected by the logged-in user is external address, thereby gaining approval of the responsible person. As receiving a reply mail that the responsible person by responding to the e-mail for approval, the e-mail with document data processed in accordance with the above described processing based on the result of analysis executed by the received mail analysis part 52, attachment is created. The e-mail thereby created is then transmitted to the destination address selected by the logged-in user. If processing is not specified in the reply mail that the responsible person sent, transmission of the e-mail is considered as approved by the responsible person with receiving the reply mail as same as described in the forth preferred embodiment. The e-mail is transmitted to the destination address selected by the logged-in user without execution of processing in this case. As the e-mail transmission part 34 transmits the e-mail, the address responsible for external address is set for the source address field and the return address field as described in the first to third preferred embodiments. In addition, the address responsible for external address is set for the multi-address transmission address field, as required.

According to the fifth preferred embodiment, the process sequence of transmission of an e-mail by the image processing device 2 is the same as that of the first preferred embodiment explained in FIG. 7 and FIG. 8. In the fifth preferred embodiment, detail of concrete processing of the advance processing of transmission to the outside (step S33) shown in FIG. 8 differs from that of the first preferred embodiment. Details of the advance processing of transmission to the outside (step S33) in the fifth preferred embodiment is explained herein below.

Figure 19:
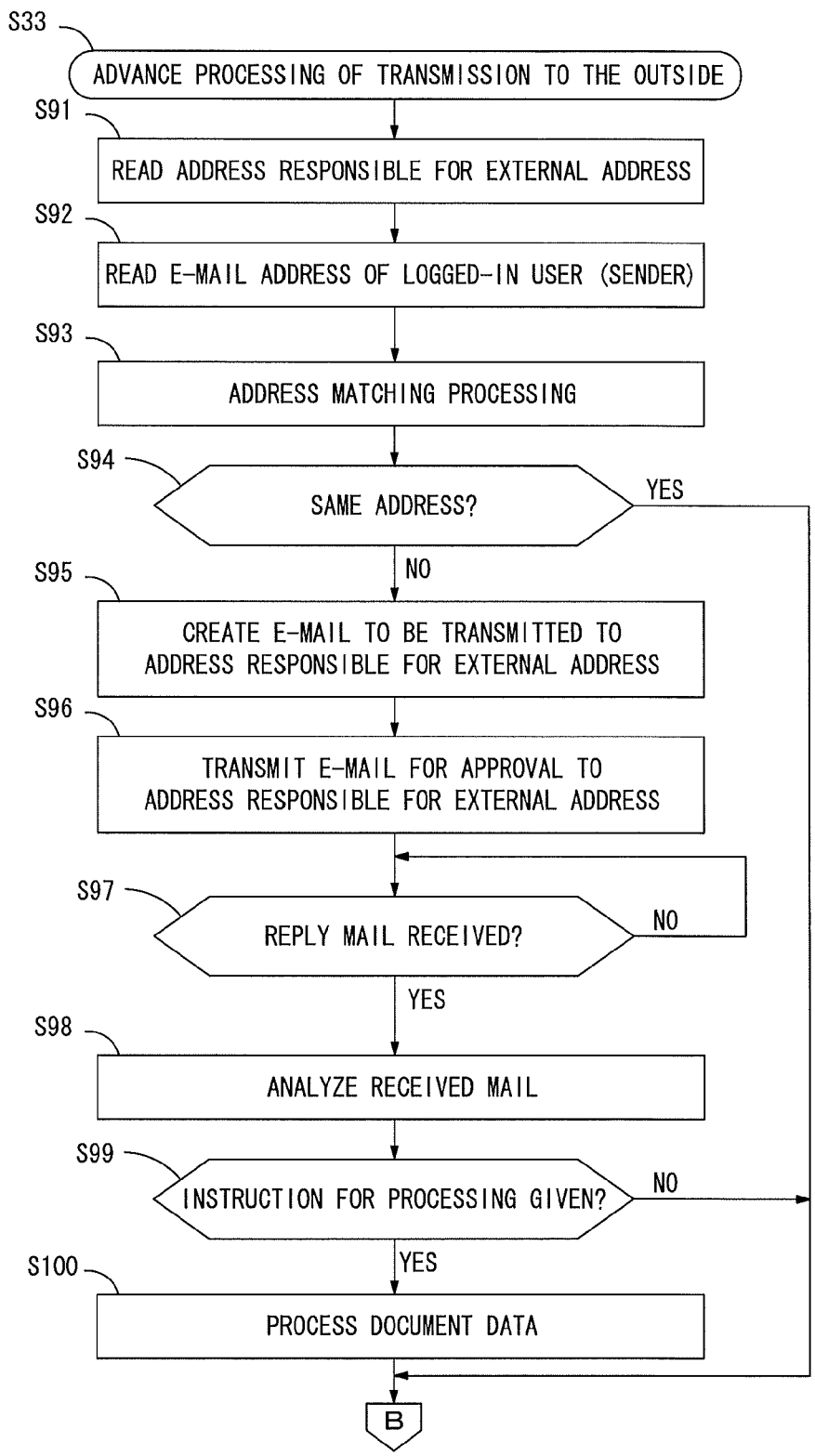
FIG. 19 is a flow diagram explaining the process sequence of advance processing of transmission to the outside in the fifth preferred embodiment in detail.
Figure 20:
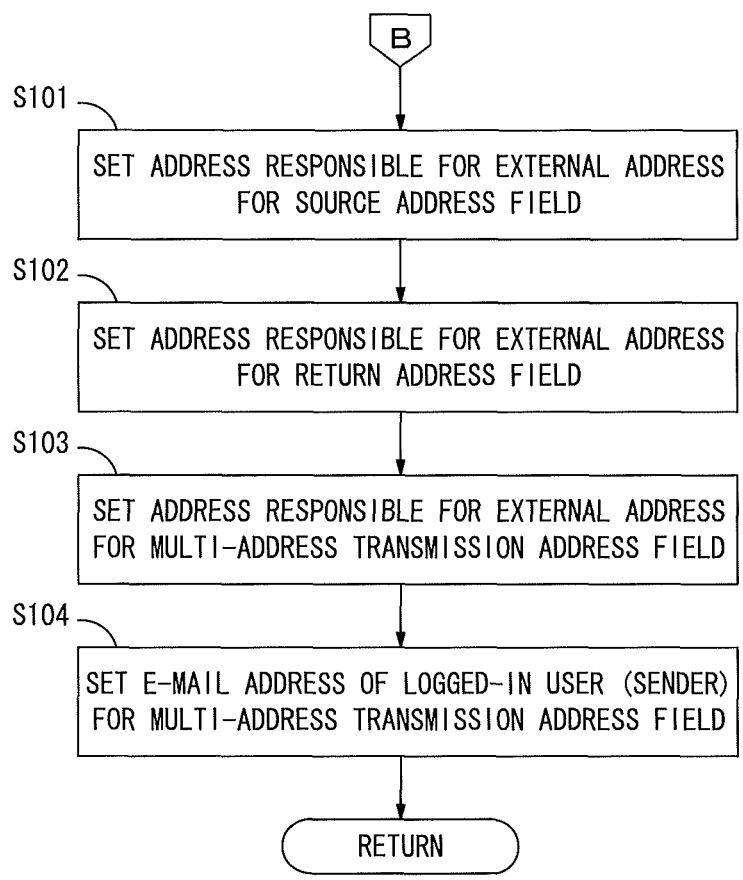
FIG. 20 is an example of an e-mail transmitted by the image processing device to external address in the fifth preferred embodiment.

FIG. 19 and FIG. 20 are flow diagrams explaining the process sequence of the advance processing of transmission to the outside (step S33) in the fifth preferred embodiment in detail. When the destination address is external address, the controller 10 reads the address responsible for external address associated with the destination address selected by the logged-in user by reference to the address responsible for external address 23*d* in the destination address registration information 23 (FIG. 5) (step S91). Also, the controller 10 reads the e-mail address 22*d* of the logged-in user by reference to the user information 22 (FIG. 4) (step S92). The controller 10 then executes address matching processing to compare the address responsible for external address with the email address of the logged-in user (step S93), and determines whether or not the logged-in user and the responsible person are the same person (step S94). That is, if those two addresses are the same as the result of the address matching processing, it proves that the logged-in user and the responsible person are the same person. If two addresses are not the same as the result of the address matching processing, it proves that the logged-in user and the responsible person are not the same person.

As the result of the address matching processing, if the addresses are not the same (when a result of step S94 is NO), the controller 10 creates the e-mail for approval to be transmitted to the address responsible for external address (step S95). The address responsible for external address is set for the destination address field, and the e-mail address of the image processing device 2 is set for the source address field and the return address field of the e-mail for approval created here. The e-mail for approval is then created with document data stored in the memory 12 or the storage device 20, attachment.

The controller 10 then transmits the e-mail for approval created in step S95 to the address responsible for external address (step S96). The responsible person is allowed to receive the e-mail for approval with document data attachment before the e-mail is transmitted to external address, and check the content or the like of the document data which is to be sent to external address. When checking the document data attached to the e-mail for approval, the responsible person checks whether or not the document data has already been processed in accordance with processing what is required for transmission to external address. If the document data is not processed as required, the responsible person specifies the required processing in the text of an e-mail when making a reply to the e-mail for approval, thereby giving instruction on the processing. If the document data has already been processed as required, the responsible person has only to make an operation to send a reply to the e-mail for approval.

After transmitting the e-mail to the address responsible for external address, the controller 10 is in a waiting state for receipt of the reply mail by the responsible person (step S97). Upon the receipt of the reply mail by the responsible person (when a result of step S97 is YES), the controller 10 executes analysis processing of received mail (step S98). In this analysis processing of received mail, processing of identifying the e-mail transmitted to the responsible person from identification information and others included in header information and the like is executed, as well as execution of processing of identifying whether or not processing of the document data is specified in the text (step S99).

When processing of the document data is specified (when a result of step S99 is YES), the controller 10 puts the document data processing part 53 into operation to function to execute the processing of document data specified by the responsible person (step S100). So, required processing of document data is executed in the process of transmission of the e-mail to external address the logged-in user selected. As an example, it is assumed the document data is not encrypted even though encryption processing of the document data to be attached to the e-mail needs to be executed. So, the responsible person specifies encryption processing, and encryption processing of the document data is then executed.

On the other hand, when processing of the document data is not specified (when a result of step S99 is NO), the processing of document data (step S100) is skipped. Also, when the addresses are the same as the result of the address matching processing (when a result of step S94 is YES), it proves the logged-in user and the responsible person are the same person. So, the processing in step S95 to step S100 is skipped.

The processing proceeds to the one explained in a flow diagram shown in FIG. 20. When transmitting the e-mail to the destination address the logged-in user selected, the controller 10 first sets the address responsible for external address in the source address field (step S101), and then sets the same in the return address field (step S102). Additionally, the controller 10 sets the address responsible for external address in the multi-address transmission address field (step S103), and sets the e-mail address of the logged-in user (sender) in the multi-address transmission address field (step S104). The e-mail with document data attachment is created thereafter, and transmitted to the destination address the logged-in user selected.

As described above, in response to receipt of the reply mail sent by the responsible person responding to the e-mail for approval, the image processing device 2 of the fifth preferred embodiment analyzes the reply mail, and executes processing of document data based on the result of the analysis. The e-mail transmission part 34 attaches the processed document data to the e-mail in which the address responsible for external address is set for the source address field and the return address field. The e-mail transmission part 34 then transmits the e-mail to the destination address designated by the logged-in user. So, the responsible person receives the e-mail for approval and checks the content of the e-mail to be sent to the destination address the logged-in user selected. At that time, if processing of document data is not executed, the responsible person gives an instruction on the processing of document data in the reply mail, thereby making the image processing device 2 to execute required processing. As a result, even when an instruction on processing of the document data is required, the responsible person may perform the operation efficiently.

Sixth Preferred Embodiment

A sixth preferred embodiment of the present invention is described next. In the above described fifth preferred embodiment, when the destination address designated by the logged-in user (sender) is external address, the e-mail for approval is always transmitted to the responsible person before the e-mail is transmitted to the external address. In the sixth preferred embodiment, however, when destination address selected by the logged-in user (sender) is external address, whether or not document data attached to the e-mail to be transmitted to the external address is processed in accordance with required processing is determined in advance. The e-mail for approval is transmitted only if required processing is not executed. Each configuration of the information processing system 1 and the image processing device 2 of the sixth preferred embodiment is the same as that of the first preferred embodiment or the fifth preferred embodiment. Difference between the sixth preferred embodiment and the fifth preferred embodiment is explained herein below.

FIG. 21 is an example of the destination address registration information 23 registered with the image processing device 2 in the sixth preferred embodiment. As illustrated in FIG. 21, the registration number 23a, the destination address of e-mail 23b, the address type 23c which shows address type of destination address, the address responsible for external address 23d which is registered if address type is external address and processing information 23e in which processing of document data is registered if address type is external address, are registered in the destination address registration information 23 of the sixth preferred embodiment. The difference between the destination address registration information 23 in FIG. 21 and that in FIG. 5 is the processing information 23e. As shown in FIG. 21, when transmitting the e-mail to external address numbered registration number "1," "encryption processing" is defined as for processing of document data. When transmitting the e-mail to external address numbered registration number "4," "time stamp" is defined as for processing of document data. Furthermore, when transmitting the e-mail to external address numbered registration number "5," "specific image synthesis" is defined as for processing of document data. "Specific image synthesis" is, for example, to synthesize specific images, such as images of company name, company logo or the like and characters and images of "confidential" or "important document." Thus, in the destination address registration information 23 shown in FIG. 21, processing of document data should be executed when transmitting the e-mail to registered external address is predetermined.

When the destination address that the logged-in user (sender) designated is external address, the image processing device 2 of the sixth preferred embodiment distinguishes required processing of document data based on the destination address registration information 23 in FIG. 21. The image processing device 2 of the sixth preferred embodiment then determines in advance whether or not document data to be attached to the e-mail transmitted to the external address is processed in accordance with required processing.

According to the sixth preferred embodiment, the process sequence of transmission of the e-mail by the image processing device 2 is the same as that of the first preferred embodiment explained in FIG. 7 and FIG. 8. In the sixth preferred embodiment, however, detail of concrete processing of the advance processing of transmission to the outside (step S33) shown in FIG. 8 differs from that of the first preferred embodiment. Details of the advance processing of transmission to the outside (step S33) in the sixth preferred embodiment is explained herein below.

Figure 22:
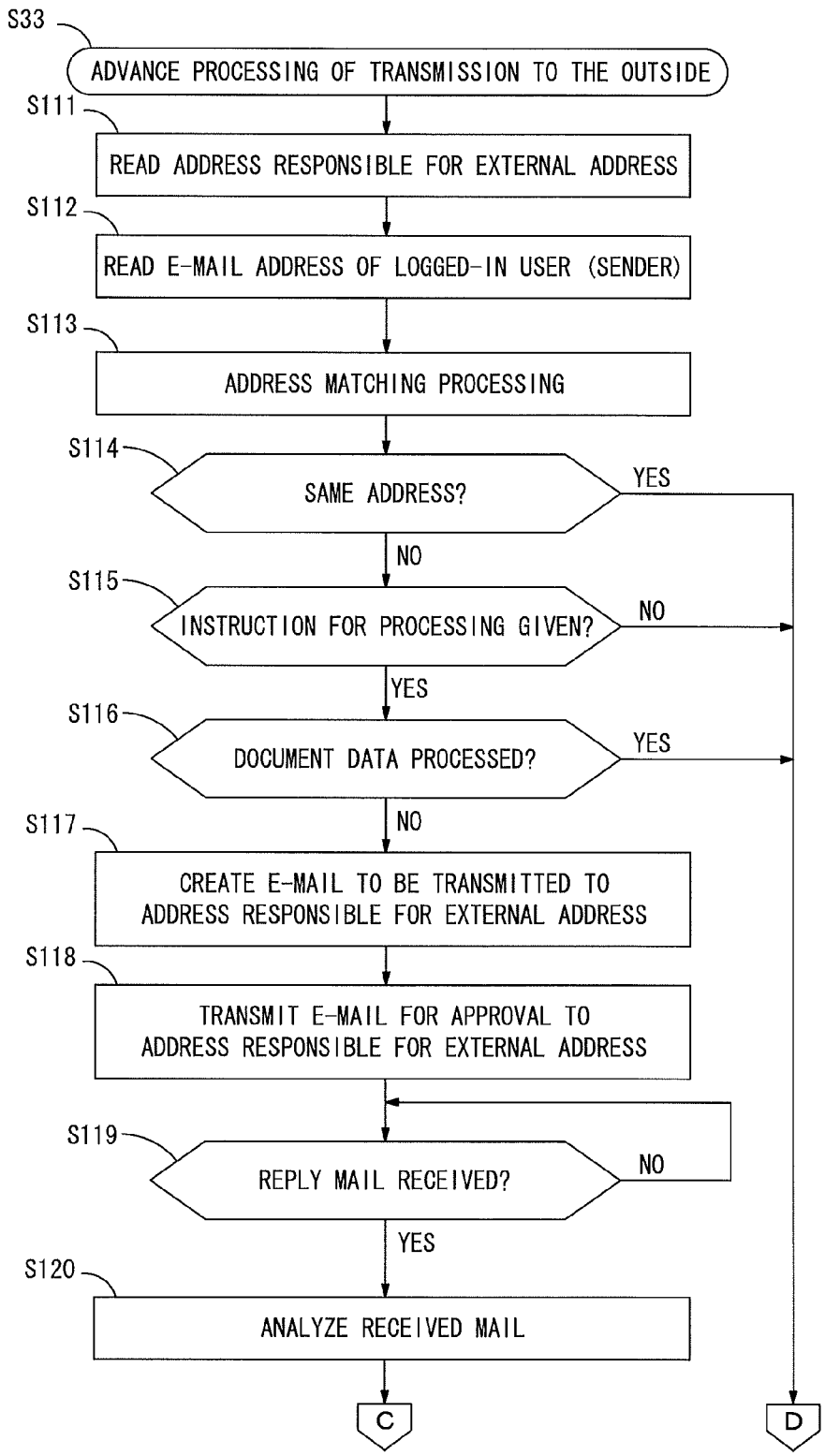
FIG. 22 is a flow diagram explaining the process sequence of advance processing of transmission to the outside in the sixth preferred embodiment in detail.
Figure 23:
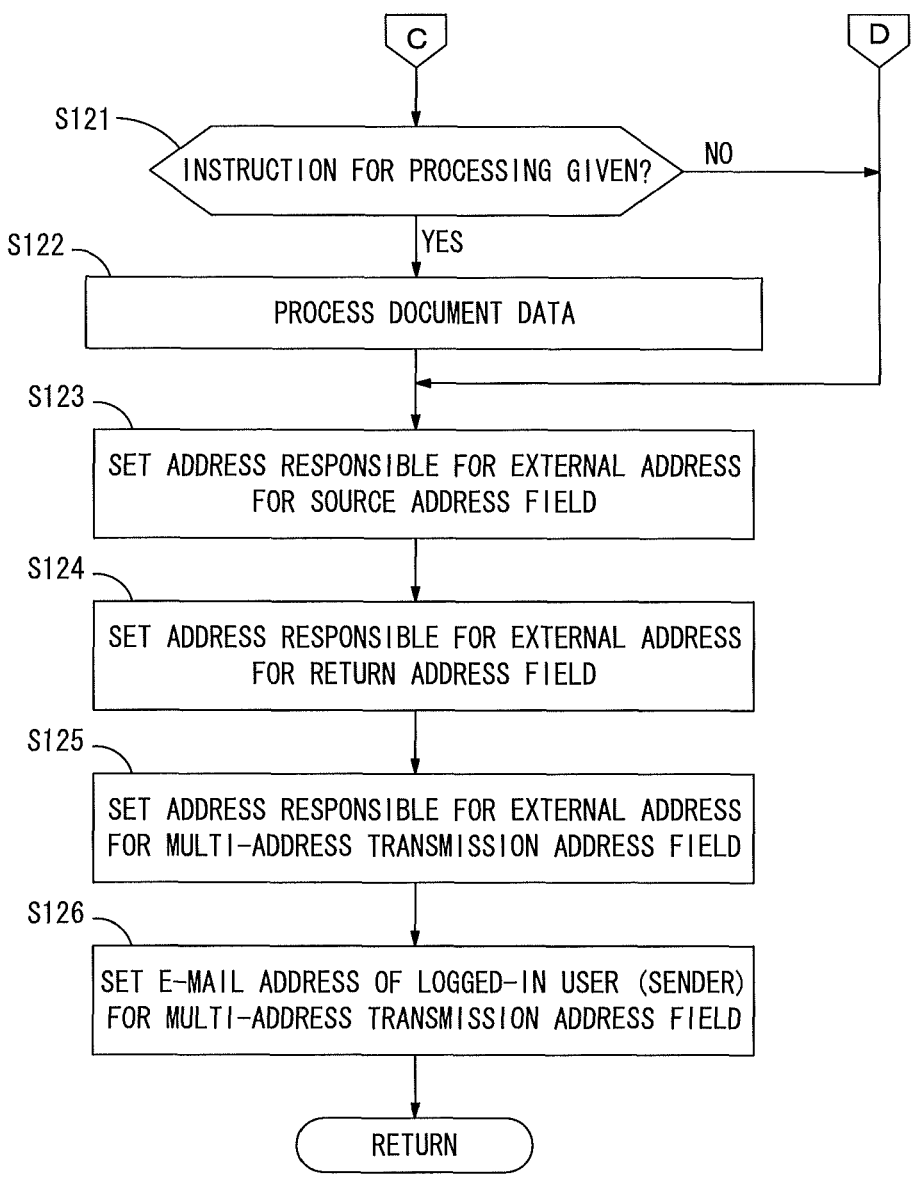
FIG. 23 is a flow diagram explaining the process sequence of advance processing of transmission to the outside in the sixth preferred embodiment in detail.

FIG. 22 and FIG. 23 are flow diagrams explaining the detailed process sequence of the advance processing of transmission to the outside (step S33) in the sixth preferred embodiment. When the destination address is external address, the controller 10 reads the address responsible for external address associated with the destination address selected by the logged-in user by reference to the address responsible for external address 23d in the destination address registration information 23 (FIG. 21) (step S111). Also, the controller 10 reads the e-mail address 22d of the logged-in user (sender) by reference to the user information 22 (FIG. 4) (step S112). The controller 10 then executes address matching processing to compare the address responsible for external address with the email address of the logged-in user (step S113), and determines whether or not the logged-in user and the responsible person are the same person.

When addresses are not the same as the result of the address matching processing (when a result of step S114 is NO), the controller 10 refers to the destination address registration information 23 (FIG. 21), thereby determining whether or not any required processing is stated for the selected destination address (step S115). When processing is stated in the destination address registration information 23 (FIG. 21) (when a result of step S115 is YES), the controller 10 determines whether or not document data stored in the memory 12 or the storage device 20 has already been processed in accordance with the stated processing (step S116). This determination is made by checking the executed processing to process document data at the execution of document scan and the generation of the document data (See step S26 and step S27 in FIG. 7). As the result of the determination, if the document data has not been processed yet (when a result of step S116 is NO), the controller 10 creates the e-mail for approval to be transmitted to the address responsible for external address (step S117). In the e-mail for approval created here, the address responsible for external address is set for the destination address field, and the e-mail address of the image processing device 2 is for the source address field and the return address field. The e-mail for approval with document data stored in the memory 12 or the storage device 20 attachment is then created.

The controller 10 then transmits the e-mail for approval created in step S117 to the address responsible for external address (step S118). So, the responsible person may receive the e-mail for approval with document data attachment and check the content and the like of the document data being transmitted to external address before the e-mail is transmitted to the external address. When checking document data attached to the e-mail, the responsible person checks whether or not the document data is processed in accordance with processing required for transmission to external address has been executed. If the document data is not processed in accordance with the required processing, the responsible person specifies the required processing in the text of the reply mail when responding to the received e-mail, thereby giving an instruction on processing.

After transmission of the e-mail to the address responsible for external address, the controller 10 is in a waiting state for receipt of the reply mail from the responsible person (step S119). As receiving the reply mail from the responsible person (when a result of step S119 is YES), the controller 10 executes analysis processing of received mail (step S120). In this analysis processing of received mail, processing of identifying the e-mail transmitted to the responsible person from identification information and others included in header information and the like is executed, as well as execution of processing of identifying whether or not processing of document data is specified in the text is executed.

The process moves on to the processing explained in the flow diagram in FIG. 23. When processing of document data is specified (when a result of step S121 is YES), the controller 10 puts the document data processing part 53 into operation to function to execute the processing of document data specified by the responsible person (step S122). As a result, when the e-mail is transmitted to external address the logged-in user selected, required processing of document data can be executed.

When processing of document data is not specified (when a result of step S121 is NO), the document data processing (step S122) is skipped. When addresses are the same as the result of the address matching processing (when a result of step S114 is YES), it proves the logged-in user is the responsible person. So, the processing in step S115 to step S122 is skipped. When any processing is not stated for the processing information 23e corresponding to external address the logged-in user designated in the destination address registration information 23 (when a result of step S115 is NO), the processing of the document data is not needed, so the processing in step S116 to step S122 is skipped. Moreover, if required processing of document data has already been executed (when a result of step S116 is YES), checking operation by the responsible person is not necessary, so the processing in step S117 to step S122 is skipped.

For transmission of the e-mail to the destination address the logged-in user selected, the controller 10 sets the address responsible for external address in the source address field (step S123), and then sets the same in the return address field (step S124). Additionally, the controller 10 also the same in the multi-address transmission address field (step S125) and sets the e-mail address of the logged-in user (sender) in the multi-address transmission address field (step S126). The e-mail with document data attachment is then created, and transmitted to the destination address the logged-in user selected.

As described herein above, in the image processing device 2 of the sixth preferred embodiment, processing of document data needs to be executed is registered in advance with the destination address registration information 23 stored in the storage device 20. As transmitting the e-mail to external address the logged-in user selected, the e-mail transmission part 34 determines whether or not processing of the document data is processed in accordance with processing registered in the destination address registration information 23. If the document data is not processed in accordance with the registered processing, the e-mail for approval is transmitted to the address responsible for external address prior to transmission of the e-mail to the destination address the logged-in user designated. So, according to the sixth preferred embodiment, only if the document data is not processed in accordance with the registered processing, approval of the responsible person is gained prior to transmission of the e-mail to destination address the logged-in user selected. So, if the document data to be sent to external address by the logged-in user is processed in accordance with the predetermined processing, approval of the responsible person is not needed to be gained, so the operation load of the responsible person may further reduced. Also, the document data transmitted to external address may be transmitted with being processed in accordance with the required processing.

Seventh Preferred Embodiment

A seventh preferred embodiment of the present invention is described next. In the seventh preferred embodiment, an example of displaying a destination address selection screen on the display unit 14 of the operational panel 13 based on the destination address registration information 23 by the image processing device 2 when a destination address is selected by the logged-in user is explained. The seventh preferred embodiment is allowed to be applied to each of the above-described first to sixth preferred embodiments. Also in the seventh preferred embodiment, each configuration of the information processing system 1 and the image processing device 2 is the same as that of the first preferred embodiment. Difference between the seventh preferred embodiment and the first preferred embodiment is explained herein below.

FIG. 24 is an example of the user information 22 registered in advance with the image processing device 2 in the seventh preferred embodiment. As illustrated in FIG. 24, information related to the user ID 22a, the user name 22b, the password 22c, the e-mail address 22d and a group 22e of a user authorized to use the image processing device 2 are registered in the user information 22 of the seventh preferred embodiment. The difference between the user information 22 shown in FIG. 24 and the same shown in FIG. 4 is the information related to the group 22e. That is, in the user information 22 of the seventh preferred embodiment, each user's group is registered, so each user's group may be identified by referring to the user information 22.

Figure 25:
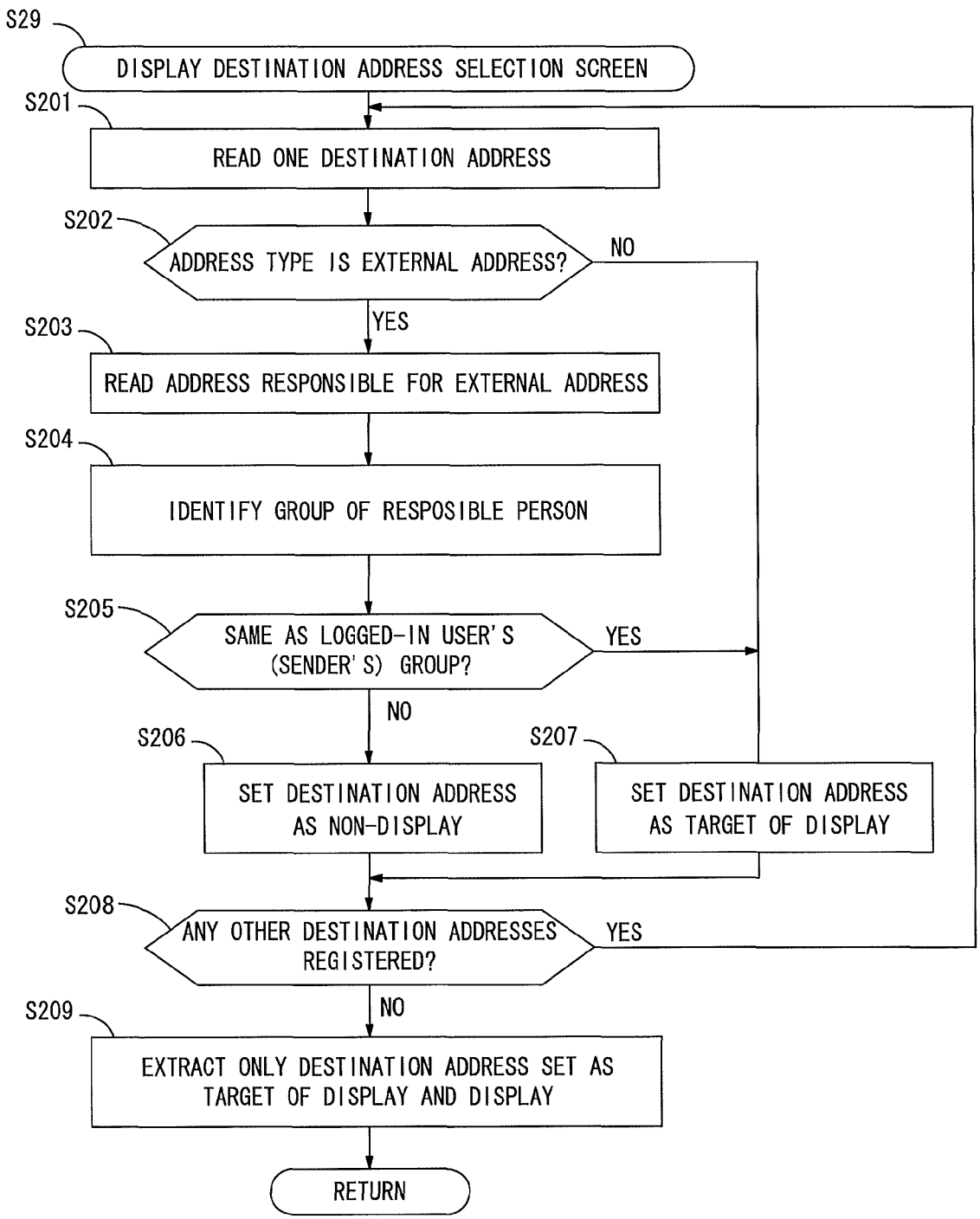
FIG. 25 is a flow diagram explaining the process sequence of displaying a destination address selection screen in the seventh preferred embodiment in detail.

In the seventh preferred embodiment, while the controller 10 of the image processing device 2 executes processing based on the flow diagram explained in FIG. 7 and FIG. 8, after the destination address registration information 23 is read from the storage device 20 (step S28), a selection destination screen is displayed on the display unit 14 of the operational panel 13 (step S29). The processing shown in FIG. 25 is executed then. The processing is explained here in below.

FIG. 25 is a flow diagram explaining the process sequence of displaying a destination address selection screen (step S29) in the seventh preferred embodiment in detail. When displaying a destination address selection screen on the display unit 14, the controller 10 first reads one of the destination addresses registered in the destination address registration information 23 (step S201). Next, the controller 10 checks address type of the read destination address, and distinguishes whether or not the address type is external address (step S202). If the address type is internal address (when a result of step S202 is NO), the controller 10 sets the read destination address as a target of display to be displayed on the display unit 14 (step S207). If address type is external address (when a result of step S202 is YES), the controller 10 reads an address responsible for external address registered corresponding to the destination address (step S203). The controller 10 searches the user information 22 shown in FIG. 24 based on the address responsible for external address, and identifies a group of the responsible person (step S204). The controller 10 then determines whether or not the logged-in user's group and the group of the responsible person are the same (step S205). If their groups are the same (when a result of step S205 is YES), the controller 10 sets the read destination address as a target of display to be displayed on the display unit 14 (step S207). If the logged-in user's group and the group of the responsible person are not the same (when a result of step S205 is NO), the controller 10 sets the read destination address as non-display on the display unit 14 (step S206). According to the processing explained above, the setting of displaying/non-displaying for the destination address read in step S201 completes.

Furthermore, the controller 10 determines whether or not any other destination addresses are registered in the destination address registration information 23 (step S208). When other destination addresses are registered, the processing returns to the process in step S201, and the controller 10 repeatedly executes the above described processing. After the settings of displaying/non-displaying for all destination addresses registered in the destination address registration information 23 completes (when a result of step S208 is NO), the controller 10 extracts only at least one destination address set as a target of display of one or more destination addresses registered in the destination address registration information 23, and displays the extracted at least one destination address on the display unit 14 (step S209).

A destination address selection screen is displayed on the display unit 14 by execution of the above-described processing. As to internal address, all addresses registered in the destination address registration information 23 can be displayed in a list form. As to external address, however, only at least one address of that the responsible person whose group is the same as one of the logged-in user is registered for its address responsible for external address 23d is displayed. So, in the seventh preferred embodiment, if a destination address registered in the destination address registration information 23 is external address, the destination address is not displayed on the destination address selection screen unless it has the group of the logged-in user the same as the one of the responsible person. That allows the logged-in user preventing transmission of the e-mail to a wrong external address by incorrect operation. According to the seventh preferred embodiment, prevention of transmission of wrong e-mail is enabled without checking operation by the responsible person, so the operation load of the responsible person may be reduced.

(Modifications)

While the preferred embodiments of the present invention have been described above, the present invention is not limited to that described above. Various modifications may be applied to the present invention.

In the foregoing description, a case of transmitting an e-mail to a destination address a user designated when the user makes an operation to specify "SCAN to E-mail" to the image processing device 2 is mainly exemplified. However, the present invention is not limited to the exemplary case. By way of example, when the image processing device 2 functions as an e-mail transmission device, document data stored in advance in the storage device 20 and others may be attached to an e-mail and the e-mail may be transmitted. In such case, as transmitting the e-mail, the image processing device 2 transmits the e-mail without execution of document scan.

Moreover, e-mail transmission in each of the preferred embodiments in the foregoing description may also be applied to so-called internet FAX (iFAX).

In addition, in each of the preferred embodiments in the foregoing description, a case that the image processing device 2 functions as an e-mail transmission device in the information processing system illustrated in FIG. 1 is mainly exemplified. However, the e-mail transmission device is not necessarily realized by the image processing device 2. For instance, the computers 5, the server 3 or the like shown in FIG. 1 may function as an e-mail transmission device. Also, the above-described e-mail transmission may be applied to various types of devices.

While the invention has been shown and described in detail, the foregoing description is in all aspects illustrative and not restrictive. It is therefore understood that numerous modifications and variations can be devised without departing from the scope of the invention.

What is claimed is:

1. An e-mail transmission device transmits an e-mail based on an operation made by a user, the device comprising:
    a storage part for storing therein a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other;
    a transmission part for transmitting the e-mail to the destination address designated by the user from a plurality of destination addresses included in said destination address registration information;
    a user address identifying part for identifying a user address of the user who makes the transmission operation of the e-mail;
    wherein when the address type registered in said address type information associated with the designated destination address is an external address, said transmission part reads said address of the person responsible for the external address associated with the designated destination address, and which is not the user address identified by said user address identifying part, creates the e-mail in which the address of the person responsible for the external address is set for a source address field and a return address field, and transmits the e-mail thereby created to the designated destination address.

2. The e-mail transmission device according to claim 1, wherein said transmission part sets said address of the person responsible for external address for a multi-address transmission address field and transmits when transmitting the e-mail in which said address of the person responsible for external address is set for the source address field and the return address field.

3. The e-mail transmission device according to claim 1, wherein:
    said transmission part sets said user address for a multi-address transmission address field and transmits when transmitting the e-mail in which said address of the person responsible for external address is set for the source address field and the return address field.

4. The e-mail transmission device according to claim 1, wherein
said destination address registration information includes processing information of processing of document data that needs to be executed when the e-mail with said document data attachment is transmitted to external address, and
when transmitting the e-mail to the destination address designated by the user, said transmission part determines whether or not the document data attached to the e-mail to be transmitted is processed in accordance with said processing information registered in said destination address registration information, and transmits an e-mail for approval to said address of the person responsible for external address prior to transmission of the e-mail to the destination address designated by the user if the document data is not processed in accordance with said processing information.

5. The e-mail transmission device according to claim 1, wherein
said storage part further stores therein a user information in which user's group is registered for each user,
said e-mail transmission device further comprising:
a display part for displaying various types of information to the user; and
a display control part for identifying the group of the user who makes the transmission operation of the e-mail by referring to said user information and displays only at least one destination address with which the address of the person responsible for external address corresponding to the identified group is associated on said display part when the user selects the destination address to send the e-mail from the plurality of destination addresses included in said destination address registration information.

6. The e-mail transmission device according to claim 1, wherein said transmission part creates the e-mail in which said user address is set for the source address field and the return address field and transmits to the designated destination address, when the address type registered in said address type information associated with the designated destination address is an internal address.

7. An e-mail transmission device transmits an e-mail based on an operation made by a user, the device comprising:
a storage part for storing therein a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other;
a transmission part for transmitting the e-mail to the destination address designated by the user from a plurality of destination addresses included in said destination address registration information;
a user address identifying part for identifying a user address of the user who makes the transmission operation of the e-mail;
an address matching part for determining whether or not said user address identified by said user address identifying part and said address responsible for external address set for the source address field and the return address field are the same;
wherein when the address type registered in said address type information associated with the designated destination address is an external address, said transmission part reads said address of the person responsible for the external address associated with the designated destination address, and which is not the user address identified by said user address identifying part, creates the e-mail in which the address of the person responsible for the external address is set for a source address field and a return address field, and transmits the e-mail thereby created to the designated destination address; and
wherein when said address matching part determines that said user address and said address of the person responsible for external address are not the same, said transmission part transmits an e-mail for approval to said address of the person responsible for external address prior to transmission of the e-mail to the destination address designated by the user.

8. The e-mail transmission device according to claim 7, further comprising:
a receipt part for receiving an e-mail, wherein
said transmission part transmits the e-mail to the destination address designated by the user when the e-mail received by said receipt part is a reply mail responding to said e-mail for approval.

9. The e-mail transmission device according to claim 7, further comprising:
a receipt part for receiving an e-mail;
an analysis part for analyzing the e-mail that said receipt part received; and
a processing part for executing processing of document data to be attached to the e-mail, wherein
when the e-mail received by said receipt part is a reply mail responding to said e-mail for approval, said analysis part analyzes the reply mail,
said processing part processes the document data attached to the e-mail transmitted by said transmission part based on the result of the analysis of said reply mail executed by said analysis part, and
said transmission part attaches the document data processed by said processing part to the e-mail in which said address of the person responsible for external address is set for the source address field and the return address field, and transmits the e-mail to the destination address designated by the user.

10. An e-mail transmission method of transmitting an e-mail based on an operation made by a user, comprising the steps of:
(a) storing a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other; and (b) transmitting the e-mail to the destination address designated by the user from a plurality of destination addresses included in said destination address registration information; and (c) identifying a user address of the user who makes the transmission operation of the e-mail;

(d) wherein in said step (b), when the address type registered in said address type information associated with the designated destination address is an external address, said address of the person responsible for the external address associated with the designated destination address, and which is not the user address identified by said user address identifying part, is read, the e-mail in which the address of the person responsible for the external address is set for a source address field and a return address field is created, and the e-mail thereby created is transmitted to the designated destination address.

11. The e-mail transmission method according to claim 10, wherein in said step (b), when the e-mail in which said address of the person responsible for external address is set for the source address field and the return address field is transmitted, said address of the person responsible for external address is set for a multi-address transmission address field and the e-mail is transmitted.

12. The e-mail transmission method according to claim 10, wherein in said step (b), when the e-mail in which said address of the person responsible for external address is set for the source address field and the return address field is transmitted, said user address is set for a multi-address transmission address field and the e-mail is transmitted.

13. The e-mail transmission method according to claim 10, wherein said destination address registration information includes processing information of processing of document data that needs to be executed when the e-mail with said document data attachment is transmitted to external address, and in said step (b), whether or not the document data attached to the e-mail to be transmitted is processed in accordance with said processing information registered in said destination address registration information is determined when the e-mail is transmitted to the destination address designated by the user, and if the document data is not processed in accordance with said processing information, an e-mail for approval is transmitted to said address of the person responsible for external address prior to transmission of the e-mail to the destination address designated by the user.

14. The e-mail transmission method according to claim 10, wherein a user information in which user's group is registered for each user is further stored in said step (a), said e-mail transmission method further comprising the steps of:

(e) displaying various types of information to the user; and (f) identifying the group of the user who makes the transmission operation of the e-mail by referring to said user information, in said step (e), only at least one destination address with which the address of the person responsible for external address corresponding to the identified group is associated is displayed when the user selects the destination address to send the e-mail from the plurality of destination addresses included in said destination address registration information.

15. The e-mail transmission method according to claim 10, wherein said transmission part creates the e-mail in which said user address is set for the source address field and the return address field and transmits to the designated destination address, when the address type registered in said address type information associated with the designated destination address is an internal address.

16. An e-mail transmission method of transmitting an e-mail based on an operation made by a user, comprising the steps of:

(a) storing a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other; and (b) transmitting the e-mail to the destination address designated by the user from a plurality of destination addresses included in said destination address registration information; and (c) identifying a user address of the user who makes the transmission operation of the e-mail;

(d) determining whether or not said user address identified in said step (c) and said address of the person responsible for external address set for the source address field and the return address field are the same;

(e) wherein in said step (b), when the address type registered in said address type information associated with the designated destination address is an external address, said address of the person responsible for the external address associated with the designated destination address, and which is not the user address identified by said user address identifying part, is read, the e-mail in which the address of the person responsible for the external address is set for a source address field and a return address field is created, and the e-mail thereby created is transmitted to the designated destination address;

wherein in said step (b), when said user address and said address of the person responsible for external address are determined not to be the same in said step (d), an e-mail for approval is transmitted to said address of the person responsible for external address prior to transmission of the e-mail to the destination address designated by the user.

17. The e-mail transmission method according to claim 16, further comprising the step of:

(f) receiving an e-mail, wherein in said step (b), the e-mail is transmitted to the destination address designated by the user when the e-mail received in said step (d) is a reply mail responding to said e-mail for approval.

18. The e-mail transmission method according to claim 16, further comprising the steps of:

(f) receiving an e-mail;

(g) analyzing the e-mail received in said step (f); and (h) executing processing of document data to be attached to the e-mail, wherein in said step (g), when the e-mail received in said step (f) is a reply mail responding to said e-mail for approval, the reply mail is analyzed, in said step (h), the document data attached to the e-mail transmitted in said step (b) is processed based on the result of the analysis of said reply mail executed in said step (e), and in said step (b), the document data processed in said step (h) is attached to the e-mail in which said address of the person responsible for external address is set for the source address field and the return address field, and the e-mail is transmitted to the destination address designated by the user.

19. A nontransitory computer readable medium on which a program is stored, said program being executed by an e-mail transmission device, said program causing said e-mail transmission device to execute processing comprising the steps of:

(a) storing a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other; and (b) transmitting the e-mail to the destination address designated by the user from a plurality of destination addresses included in said destination address registration information; and (c) identifying a user address of the user who makes the transmission operation of the e-mail;

(d) wherein in said step (b), when the address type registered in said address type information associated with the designated destination address is an external address, said address of the person responsible for the external address associated with the designated destination address, and which is not the user address identified by said user address identifying part, is read, the e-mail in which the address of the person responsible for the external address is set for a source address field and a return address field is created, and the e-mail thereby created is transmitted to the designated destination address.

20. The nontransitory computer readable medium according to claim 19, wherein in said step (b), when the e-mail in which said address of the person responsible for external address is set for the source address field and the return address field is transmitted, said address of the person responsible for external address is set for a multi-address transmission address field and the e-mail is transmitted.

21. The nontransitory computer readable medium according to claim 19, wherein in said step (b), when the e-mail in which said address of the person responsible for external address is set for the source address field and the return address field is transmitted, said user address is set for a multi-address transmission address field and the e-mail is transmitted.

22. The nontransitory computer readable medium according to claim 19, wherein said transmission part creates the e-mail in which said user address is set for the source address field and the return address field and transmits to the designated destination address, when the address type registered in said address type information associated with the designated destination address is an internal address.

23. A nontransitory computer readable medium on which a program is stored, said program being executed by an e-mail transmission device, said program causing said e-mail transmission device to execute processing comprising the steps of:

(a) storing a destination address registration information in which a destination address of the e-mail, an address type information in which either of internal address or external address is registered as a type of the destination address, and when the address type registered in said address type information is an external address, the destination address registration information further includes an address of a person responsible for the external address, which person is in charge of said external address, wherein the destination address, the address type information, and the address of the person responsible for the external address are associated with each other; and (b) transmitting the e-mail to the destination address designated by the user from a plurality of destination addresses included in said destination address registration information; and (c) identifying a user address of the user who makes the transmission operation of the e-mail;

(d) determining whether or not said user address identified in said step (c) and said address of the person responsible for external address set for the source address field and the return address field are the same, (e) wherein in said step (b), when the address type registered in said address type information associated with the designated destination address is an external address, said address of the person responsible for the external address associated with the designated destination address, and which is not the user address identified by said user address identifying part, is read, the e-mail in which the address of the person responsible for the external address is set for a source address field and a return address field is created, and the e-mail thereby created is transmitted to the designated destination address; and in said step (b), when said user address and said address of the person responsible for external address are determined not to be the same in said step (d), an e-mail for approval is transmitted to said address responsible for external address prior to transmission of the e-mail to the destination address designated by the user.

* * * * *